US012701348B2

(12) United States Patent
Watts et al.

(10) Patent No.: US 12,701,348 B2
(45) Date of Patent: Aug. 4, 2026

(54) MANAGING CONTROL OF OPTICAL PHASED ARRAYS WITH MULTIPLE OPTICAL SOURCE PORTS

(71) Applicant: Analog Photonics LLC, Boston, MA (US)

(72) Inventors: Michael Robert Watts, Hingham, MA (US); Matthew Byrd, Arlington, MA (US); Christopher Vincent Poulton, Somerville, MA (US); Benjamin Roy Moss, Cambridge, MA (US)

(73) Assignee: Analog Photonics LLC, Boston, MA (US)

( * ) Notice: Subject to any disclaimer, the term of this patent is extended or adjusted under 35 U.S.C. 154(b) by 176 days.

(21) Appl. No.: 18/644,598

(22) Filed: Apr. 24, 2024

(65) Prior Publication Data

US 2024/0365030 A1     Oct. 31, 2024

Related U.S. Application Data

(60) Provisional application No. 63/462,606, filed on Apr. 28, 2023.

(51) Int. Cl.
| | |
|---|---|
| *H04Q 11/00* | (2006.01) |
| *H04J 14/02* | (2006.01) |
| *H04B 10/50* | (2013.01) |

(52) U.S. Cl.
CPC ...... *H04Q 11/0067* (2013.01); *H04J 14/0282* (2013.01); *H04B 10/503* (2013.01); *H04Q 2011/0086* (2013.01)

(58) Field of Classification Search
CPC ......... H04Q 11/0067; H04Q 2011/0086; H04J 14/0282; H04B 10/503
See application file for complete search history.

(56) References Cited

U.S. PATENT DOCUMENTS

| | | | |
|---|---|---|---|
| 11,061,140 B2 | 7/2021 | Hosseini et al. | |
| 2019/0260123 A1* | 8/2019 | Poulton ................. | G02F 1/2955 |

(Continued)

OTHER PUBLICATIONS

Hiroyuki Ito et al., "Wavelength-division multiplexing Si photonic crystal beam steering device for high-throughput parallel sensing", Opt. Express, vol. 26, pp. 26145-26155, 2018, DOI: 10.1364/OE. 26.026145.

(Continued)

*Primary Examiner* — Pranesh K Barua
(74) *Attorney, Agent, or Firm* — Young Basile Hanlon & MacFarlane P.C

(57) ABSTRACT

Steering light includes: providing, from a plurality of optical source ports, a respective optical wave that is tuned over different respective wavelengths, within different respective time slots; emitting at least a portion of the light from at least one optical phased array comprising a plurality of optical phase shifters, and a plurality of optical grating antennas; distributing at least a portion of the light using at least one optical distribution network (ODN) comprising: one or more ODN input ports, and two or more ODN output ports each coupled to a different respective one of the optical phase shifters; and coupling at least a portion of the light using at least one optical coupler (OC) comprising: at least one OC input port coupled to one of the optical source ports, and at least one OC output port coupled to one of the one or more ODN input ports.

20 Claims, 18 Drawing Sheets

(56)     References Cited

U.S. PATENT DOCUMENTS

| 2019/0296517 A1 | 9/2019 | Lealman | |
| 2021/0103199 A1* | 4/2021 | Wu | G01S 7/4818 |
| 2022/0236486 A1* | 7/2022 | Muñoz Muñoz | G02B 6/34 |

OTHER PUBLICATIONS

Y. Zhu et al., "Hybrid Integration of Multi-Band, Tunable External-Cavity Diode Lasers for Wide-Angle Beam Steering", in Conference on Lasers and Electro-Optics, OSA Technical Digest, Optica Publishing Group, 2 pages, 2019, DOI: 10.1364/CLEO_SI.2019. SF3N.3.

\* cited by examiner

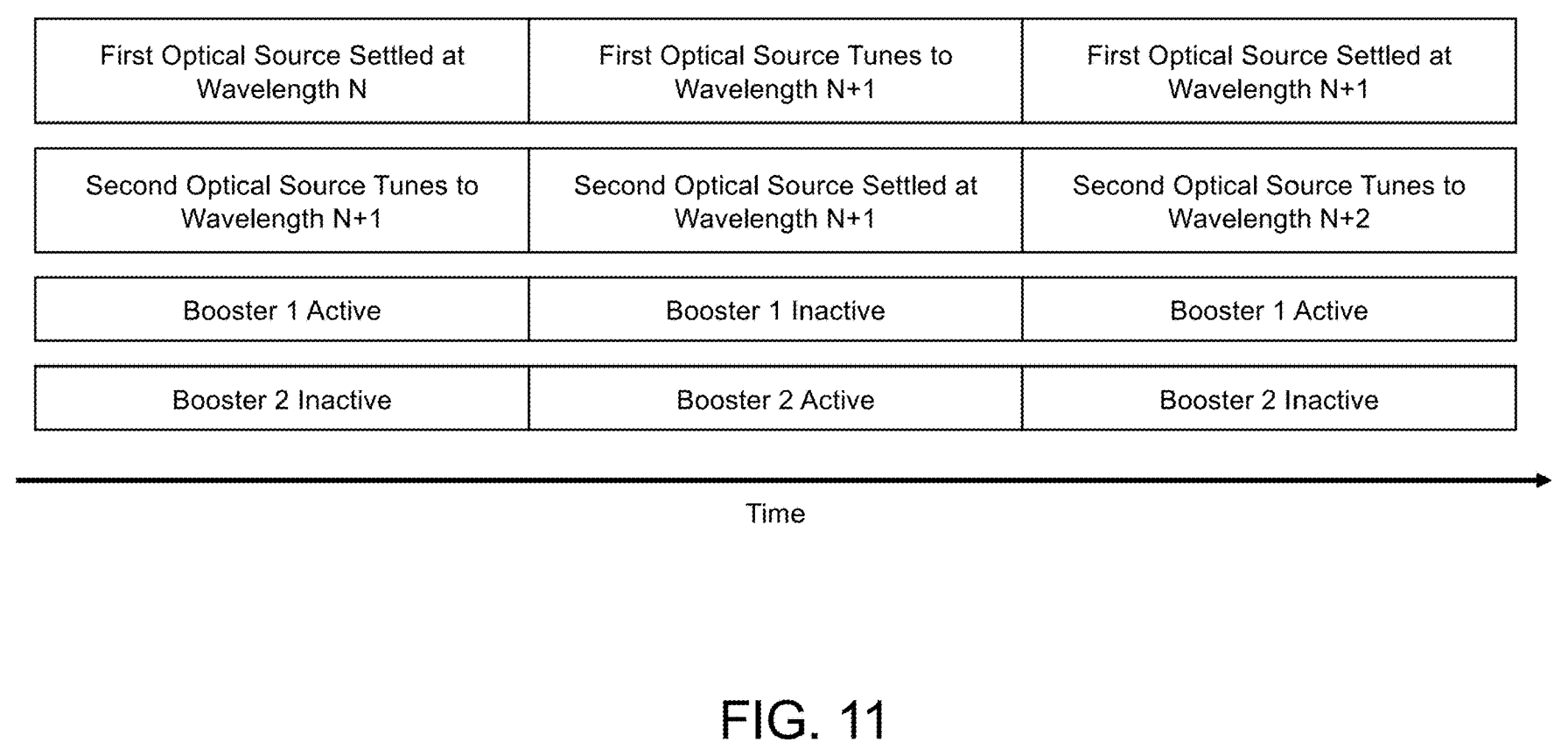

| First Optical Source Settled at Wavelength N | First Optical Source Tunes to Wavelength N+1 | First Optical Source Settled at Wavelength N+1 |
| --- | --- | --- |
| Second Optical Source Tunes to Wavelength N+1 | Second Optical Source Settled at Wavelength N+1 | Second Optical Source Tunes to Wavelength N+2 |
| Booster 1 Active | Booster 1 Inactive | Booster 1 Active |
| Booster 2 Inactive | Booster 2 Active | Booster 2 Inactive |

Time →

FIG. 11

MANAGING CONTROL OF OPTICAL PHASED ARRAYS WITH MULTIPLE OPTICAL SOURCE PORTS

CROSS-REFERENCE TO RELATED APPLICATION(S)

This application claims priority to and the benefit of U.S. Provisional Application No. 63/462,606, entitled "MANAGING CONTROL OF OPTICAL PHASED ARRAYS WITH MULTIPLE OPTICAL SOURCE PORTS," filed Apr. 28, 2023, incorporated herein by reference.

TECHNICAL FIELD

This disclosure relates to managing control of optical phased arrays with multiple optical source ports.

BACKGROUND

Some photonic integrated circuits (PICs) can enable beam steering, for example, by utilizing one or more optical phased arrays (OPAs). Some OPAs have a linear distribution of optical antennas (also referred to as optical emitters) along an array direction. Beam steering about a first axis perpendicular to the array direction can be achieved by modifying the relative phase shifts in phase shifters that are optically coupled to each of the optical antennas. Such beam steering can be performed in a solid-state manner, rapidly, and potentially with random-access, but may be limited to one dimension. Other techniques can be used for steering about a second axis orthogonal to the first axis.

One application of beam steering can be found in some LiDAR systems, where an optical beam from an optical source (e.g., a laser) can be transmitted using an OPA to target one or more objects at a given distance, and the light backscattered from the target objects can be collected using another OPA. Various techniques, such as modulation and/or time of flight, can be used to determine the distance to the target object(s) based on information associated with a detection event. Another application in which beam steering may be relevant is in free-space optical communications.

In some examples, an optical source may provide an optical beam (also referred to as an optical wave) that has a narrow linewidth and a peak wavelength that falls in a particular range (e.g., between about 100 nm to about 1 mm, or some subrange thereof), also referred to herein as simply "light".

SUMMARY

In one aspect, in general, an apparatus comprises: a plurality of optical source ports, each configured to provide a respective optical wave that is tuned over different respective wavelengths, and provided within different respective time slots; at least one optical phased array comprising a plurality of optical phase shifters, and a plurality of optical grating antennas, including two or more optical grating antennas each coupled to a different respective one of the optical phase shifters; at least one optical distribution network (ODN) comprising: a plurality of ODN input ports, and a plurality of ODN output ports, including two or more ODN output ports each coupled to a different respective one of the optical phase shifters, wherein each of the two or more ODN output ports is coupled to a single one of the plurality of ODN input ports; and at least one passive multiport optical coupler (PMOC) comprising: a plurality of PMOC input ports, including two or more PMOC input ports each coupled to a different respective one of the optical source ports, and a plurality of PMOC output ports, including two or more PMOC output ports each coupled to a different respective one of the plurality of ODN input ports, wherein a first of the two or more PMOC input ports is coupled to a first and second of the two or more PMOC output ports over different respective propagation paths having a first relative optical phase shift, and a second of the two or more PMOC input ports is coupled to the first and second of the two or more PMOC output ports over the different respective propagation paths having a second relative optical phase shift different from the first relative optical phase shift.

In another aspect, in general, a method for steering light comprises: providing, from a plurality of optical source ports, a respective optical wave that is tuned over different respective wavelengths, within different respective time slots; emitting at least a portion of the light from at least one optical phased array comprising a plurality of optical phase shifters, and a plurality of optical grating antennas, including two or more optical grating antennas each coupled to a different respective one of the optical phase shifters; distributing at least a portion of the light using at least one optical distribution network (ODN) comprising: a plurality of ODN input ports, and a plurality of ODN output ports, including two or more ODN output ports each coupled to a different respective one of the optical phase shifters, wherein each of the two or more ODN output ports is coupled to a single one of the plurality of ODN input ports; and coupling at least a portion of the light using at least one passive multiport optical coupler (PMOC) comprising: a plurality of PMOC input ports, including two or more PMOC input ports each coupled to a different respective one of the optical source ports, and a plurality of PMOC output ports, including two or more PMOC output ports each coupled to a different respective one of the plurality of ODN input ports, wherein a first of the two or more PMOC input ports is coupled to a first and second of the two or more PMOC output ports over different respective propagation paths having a first relative optical phase shift, and a second of the two or more PMOC input ports is coupled to the first and second of the two or more PMOC output ports over the different respective propagation paths having a second relative optical phase shift different from the first relative optical phase shift.

Aspects can include one or more of the following features.

The apparatus further comprises circuitry configured to provide a control signal to at least a first of the optical phase shifters for controlling an optical phase shift imposed by the first of the optical phase shifters.

The control signal is based at least in part on the first relative optical phase shift and the second relative optical phase shift.

The control signal is based at least in part on the first relative optical phase shift during a first of the time slots associated with a first of the optical source ports, and is based at least in part on the second relative optical phase shift during a second of the time slots associated with a second of the optical source ports.

Each of the two or more PMOC input ports is coupled to all of the two or more PMOC output ports.

Each of the two or more PMOC input ports is coupled to at least one of the two or more PMOC output ports with an optical loss of less than 50%.

Each of the two or more PMOC input ports is coupled to at least one of the two or more PMOC output ports with an optical loss of less than 20%.

The different respective wavelengths for different optical source ports are not overlapping.

The different respective time slots for different optical source ports are not overlapping.

The apparatus further comprises a plurality of optical sources coupled to different ones of the plurality of optical source ports, each optical source configured to provide one of the respective optical waves.

In another aspect, in general, an apparatus comprises: a plurality of optical source ports, each configured to provide a respective optical wave that is tuned over different respective wavelengths, and provided within different respective time slots of a plurality of time slots; at least one optical phased array comprising a plurality of optical phase shifters, and a plurality of optical grating antennas, including two or more optical grating antennas each coupled to a different respective one of the optical phase shifters; at least one optical distribution network (ODN) comprising: one or more ODN input ports, and a plurality of ODN output ports, including two or more ODN output ports each coupled to a different respective one of the optical phase shifters; and at least one optical coupler (OC) comprising: one or more OC input ports, including at least one OC input port coupled to one of the optical source ports, and one or more OC output ports, including at least one OC output port coupled to one of the one or more ODN input ports; wherein a single period of a repeating pattern of wavelengths are provided from the plurality of optical source ports in the plurality of time slots, the plurality of time slots comprising: a first time slot in which a first of the plurality of optical source ports provides an optical wave tuned to a first wavelength, a second time slot, starting at or after an end of the first time slot, in which a second of the plurality of optical source ports provides an optical wave tuned to a second wavelength different from the first wavelength, and a third time slot, starting at or after an end of the second time slot, in which the first of the plurality of optical source ports provides an optical wave tuned to a third wavelength between the first wavelength and the second wavelength.

In another aspect, in general, a method for steering light comprises: providing, from a plurality of optical source ports, a respective optical wave that is tuned over different respective wavelengths, within different respective time slots of a plurality of time slots; emitting at least a portion of the light from at least one optical phased array comprising a plurality of optical phase shifters, and a plurality of optical grating antennas, including two or more optical grating antennas each coupled to a different respective one of the optical phase shifters; distributing at least a portion of the light using at least one optical distribution network (ODN) comprising: one or more ODN input ports, and a plurality of ODN output ports, including two or more ODN output ports each coupled to a different respective one of the optical phase shifters; and coupling at least a portion of the light using at least one optical coupler (OC) comprising: one or more OC input ports, including at least one OC input port coupled to one of the optical source ports, and one or more OC output ports, including at least one OC output port coupled to one of the one or more ODN input ports; wherein a single period of a repeating pattern of wavelengths are provided from the plurality of optical source ports in the plurality of time slots, the plurality of time slots comprising: a first time slot in which a first of the plurality of optical source ports provides an optical wave tuned to a first wavelength, a second time slot, starting at or after an end of the first time slot, in which a second of the plurality of optical source ports provides an optical wave tuned to a second wavelength different from the first wavelength, and a third time slot, starting at or after an end of the second time slot, in which the first of the plurality of optical source ports provides an optical wave tuned to a third wavelength between the first wavelength and the second wavelength.

Aspects can include one or more of the following features.

The at least one optical coupler comprises two or more optical couplers, the at least one optical distribution network comprises two or more optical distribution networks, and the at least one optical phased array comprises two or more optical phased arrays, wherein the two or more optical phased arrays comprise: a first optical phased array (OPA), and a second optical phased array (OPA); the two or more optical distribution networks comprise: a first optical distribution network (ODN) coupled to the first OPA, and a second optical distribution network (ODN) coupled to the second OPA; and the two or more optical couplers comprise: a first optical coupler comprising a first waveguide coupling the first of the plurality of optical source ports to the first ODN, and a second optical coupler comprising a second waveguide coupling the second of the plurality of optical source ports to the second ODN.

The at least one optical coupler comprises an optical switch that switches the at least one OC output port among different ones of the one or more OC input ports, including an OC input port coupled to the first of the plurality of optical source ports and an OC input port coupled to the second of the plurality of optical source ports.

The at least one optical coupler comprises a passive multiport optical coupler that comprises a plurality of OC input ports and a plurality of OC output ports.

Aspects can have one or more of the following advantages.

The techniques described herein can be used to electronically calibrate the phase shifters of an OPA to facilitate beam steering using multiple wavelength-tuned optical sources. When the optical waves are combined as described herein, a larger beam steering range can be achieved without the loss that may be suffered using other techniques for combining multiple wavelength-tuned optical sources.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 11 is a schematic diagram of an example timing diagram for time-division multiplexing.

DETAILED DESCRIPTION

Some steerable optical systems (SOSs), such as LiDAR systems, use an optical beam that is steered over a field of view to determine estimated distances to targets within the field of view. Wavelength-based steering can be performed in an SOS that utilizes an optical phased array (OPA) comprising an array of optical antennas (e.g., grating-based optical antennas) that emit light at different angles for different wavelengths. For example, one dimension of steering can be provided by phase-based steering obtained by controlling phase shifters coupled to the optical antennas, and another dimension of steering can be provided by wavelength-based steering obtained by tuning an optical source (e.g., a laser) over a range of wavelengths.

In order to achieve a wide field of view by performing wavelength-based steering with an OPA, an optical source having a large optical bandwidth can be used. However, typical optical gain mediums in some optical sources can have a limited optical bandwidth, and thus multiple different optical sources may be used in an SOS so as to span the desired wavelength range. In some examples, optical waves emitted by different respective lasers can be multiplexed in order to allow all of the optical waves to be emitted out of the SOS. One technique to achieve this result is to utilize wavelength selective structures that allow multiple beams to be emitted at once. However, these structures may come at the cost of additional optical loss and control complexity. Thus, an alternative technique is to provide light into the SOS from a single laser at any given time and to switch between which laser is being used to provide light to the SOS. Such an SOS can be implemented with reduced excess loss and reduced control complexity.

Some example implementations described herein are based on the principle of time-division multiplexing. In some examples of time-division multiplexing, only light provided by a single laser is emitted by an SOS at any given point in time. For example, after a first laser has swept through one or more wavelengths in the wavelength range spanned by its gain medium, the first laser will turn off and a second laser will turn on. Then, the SOS will switch to now emit light provided from the second laser instead of the first laser, and the second laser will sweep through one or more wavelengths in its wavelength range. Such a process may continue until all lasers have been activated and all of their corresponding wavelength ranges have been scanned, at which point the entire cycle can be repeated.

Figures 1A, 1B:
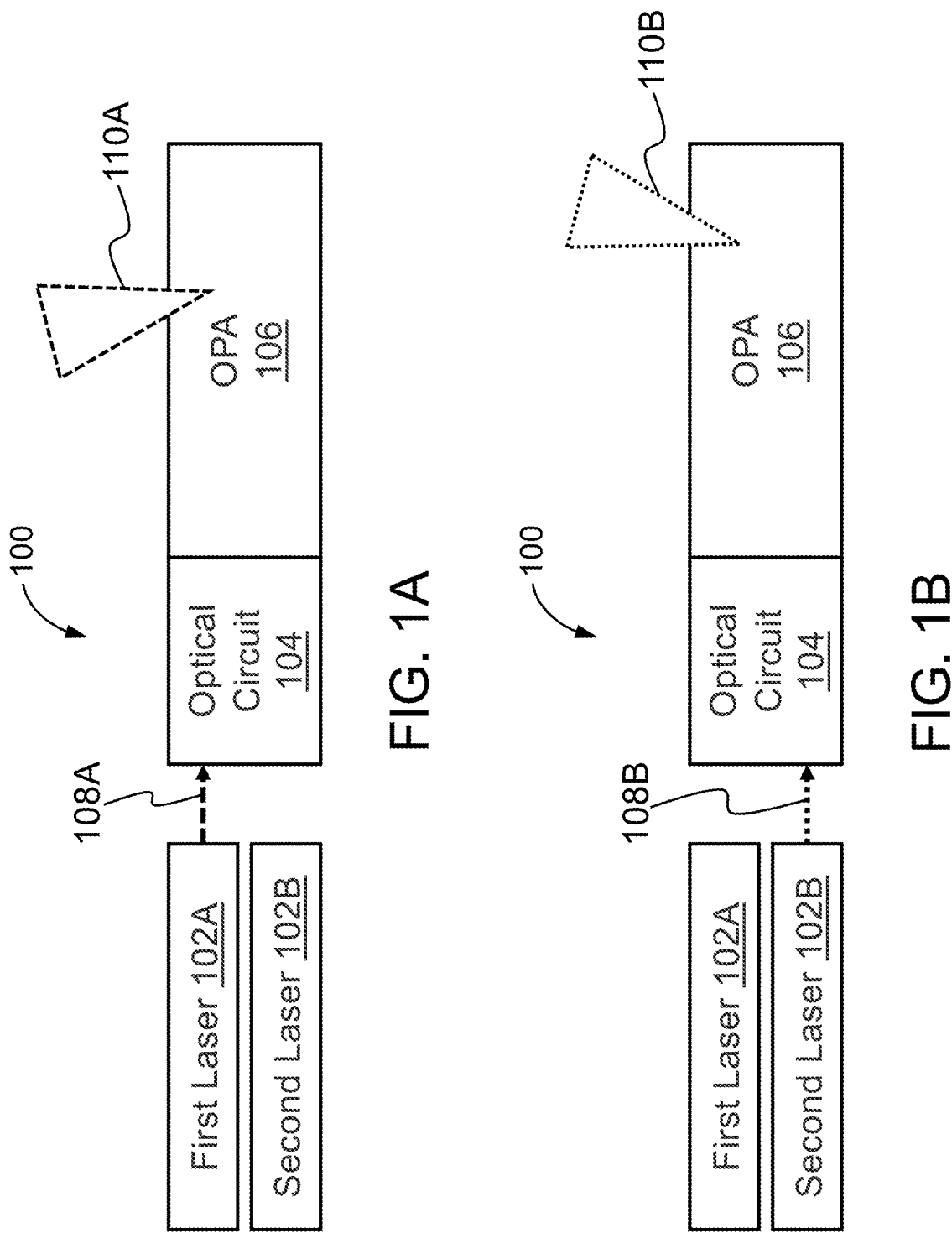
FIGS. 1A and 1B are schematic diagrams of an example time-division multiplexed steerable optical system.

FIGS. 1A and 1B show an example time-division multiplexed SOS 100 comprising a first laser 102A and a second laser 102B each optically coupled to an optical circuit 104. The optical circuit 104 is optically coupled to an OPA 106 that emits light over a region that depends on the wavelength of the light. Referring to FIG. 1A, during a first duration of time, the second laser 102B does not emit light while the first laser 102A emits a first set of optical waves 108A characterized by a first range of wavelengths that are then emitted by the OPA 106 over a first region 110A (i.e., a portion of a field of view). Referring to FIG. 1B, during a second duration of time, the first laser 102A does not emit light while the second laser 102B emits a second set of optical waves 108B characterized by a second range of wavelengths that are then emitted by the OPA 106 over a second region 110B. Each region can correspond to a different field-of-view. In some examples, the first duration of time and the second duration of time are equal (i.e., the first set of optical waves 108A and the second set of optical waves 108B are emitted over the first region 110A and the second region 110B, respectively, for an equivalent amount of time). In addition to emitting light in a beam that is formed by constructive and destructive interference among light from the different antennas in a transmit mode of operation, the OPAs can also receive light from directions corresponding to the beam field-of-view in a receive mode of operation. The phase shifters can be used to steer both the transmit direction and the receive direction. In general, the time-division multiplexed SOS 100 can be generalized to a time-division multiplexed SOS comprising two or more lasers (and/or other coherent optical sources) providing optical waves at different times, and optionally over different respective wavelength ranges for transmitting and/or receiving within different respective regions of space.

Figures 1C, 1D:
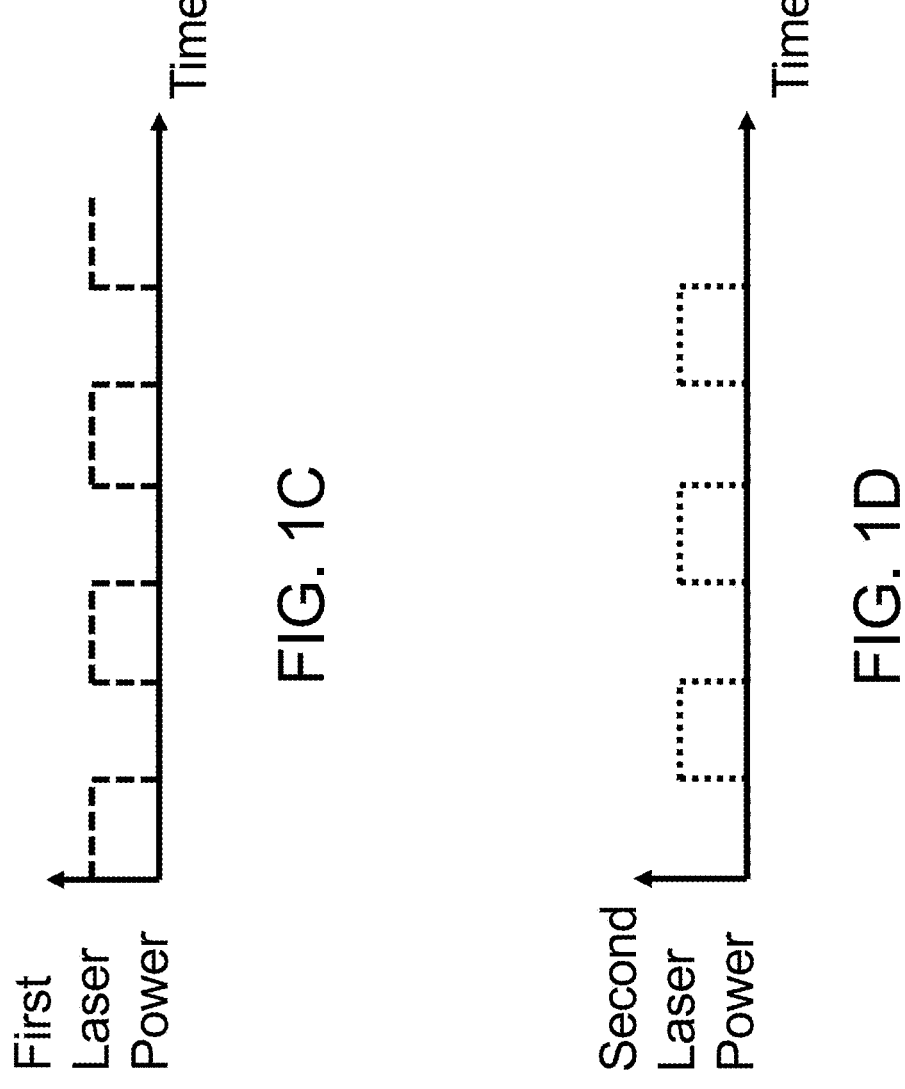
FIGS. 1C and 1D are example plots of the optical power emitted by a first laser and the optical power emitted by a second laser.

FIGS. 1C and 1D, respectively, show example plots of the optical power emitted by a first laser and the optical power emitted by a second laser (e.g., the first laser 102A and the second laser 102B in the time-division multiplexed SOS 100 shown in FIGS. 1A and 1B). In this example, the first laser emits pulses of light over a first set of times, while the second laser emits pulses of light over a second set of times, where the first set of times and the second set of times do not overlap in time.

A variety of techniques for controlling and steering OPAs are described herein, first in the context of phase-based steering, and then followed by techniques for switching among multiple optical sources used for wavelength-based steering. In some implementations, the steering that is described herein may refer to steering an angle from which a beam will be received by an SOS and/or an angle from which a beam will be transmitted by an SOS.

An individual optical phase shifter element (or simply "phase shifter element") can be controlled electronically by adjusting the voltage across the phase shifter element, by adjusting the current through the phase shifter element, and/or by adjusting the power to the phase shifter element. In some SOS implementations, one or more electronic integrated circuits (EICs) contain digital-to-analog converters (DACs) to provide individual control of each phase shifter element. For example, digital electronic input codes can command a single DAC to provide an individual phase shifter element with a specific phase setting. In such an SOS, the EIC can be co-designed to meet system constraints (e.g., low footprint area or low power consumption). The EIC may include integrated digital logic (e.g., a digital beamforming controller) to supply the appropriate digital electronic input codes for the DACs to steer and/or calibrate an OPA, which can include information used to implement the wavelength-based steering described herein. The digital logic can be implemented in the circuitry of an application-specific integrated circuit (ASIC) or in the circuitry of a field-programmable gate array (FPGA), for example, or in any of a variety of different types of digital circuitry, including any number of central or graphics processor cores, or other processing engines, that may be included in, or in communication with, the EIC.

An OPA with a relatively large number of phase shifter elements (e.g., thousands of phase shifter elements) can benefit from an optimized controller, such as an array of electronic phase shifter drivers controlled, for example, by an integrated digital beamforming controller (DBC). The electronic phase shifter driver circuits can be realized as DACs co-designed and optimized to provide the appropriate voltages and/or currents to the phase shifter elements to allow specific phase control in adjustable increments (e.g., up to and in excess of $2\pi$ radians). An individual DAC accepts digital electronic inputs to direct a specific phase setting for the corresponding phase shifter element. In an array of thousands of such DACs, the amount of digital data required to direct the electronic inputs to the thousands of DACs can be large, creating design tradeoffs of power, timing, bandwidth, crosstalk/interference, wiring congestion, and area footprint. An on-chip DBC can reduce the system input data by logically performing computations that can be based on a phased array computational steering model to locally compute DAC input codes.

Figure 2A:
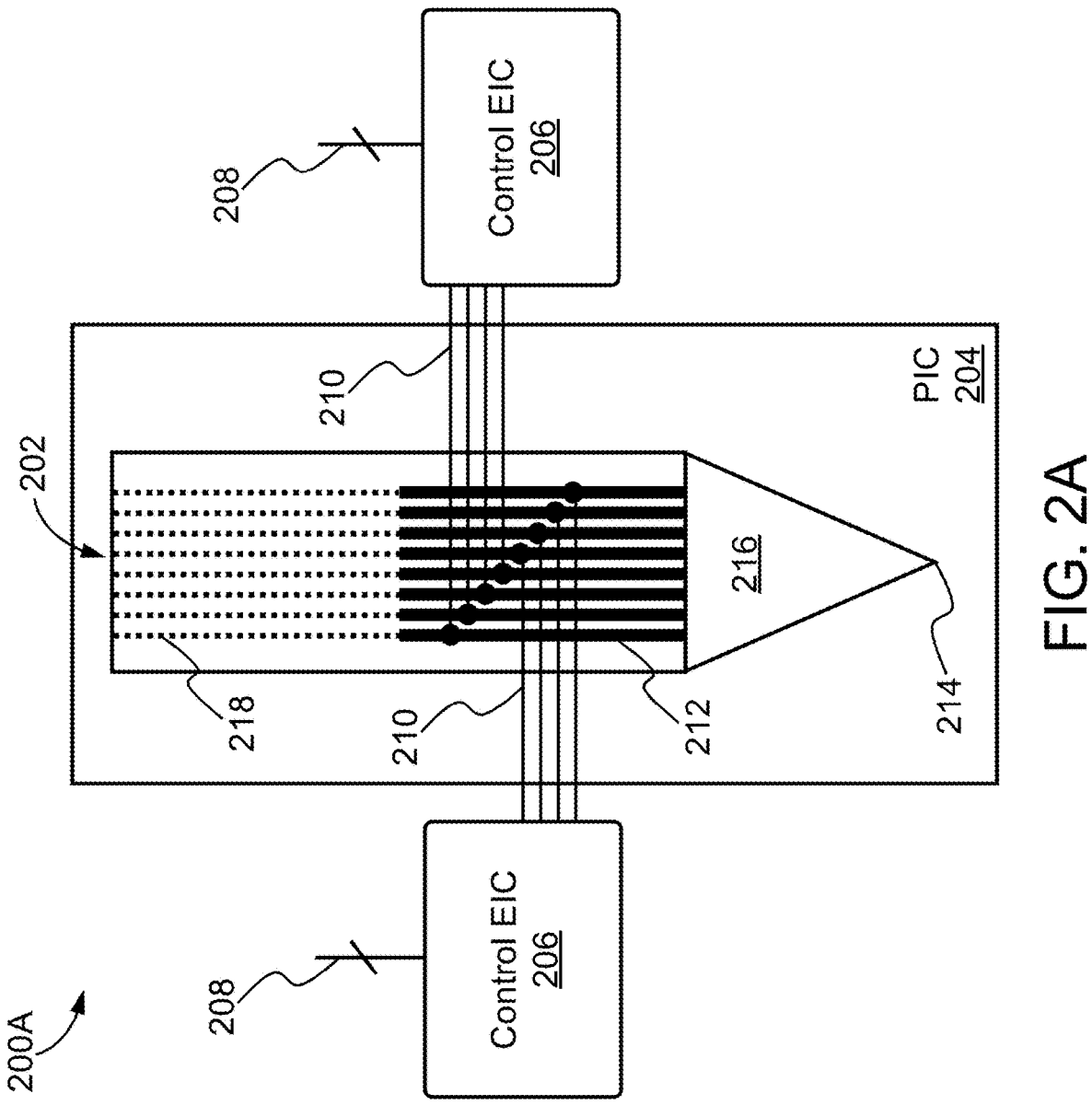
FIG. 2A is a schematic diagram of an example steerable optical system.

FIG. 2A shows an example SOS 200A comprising an OPA 202 located on a PIC 204 and controlled by two control EICs 206 each electrically connected to a respective interface bus 208. In general, one or many control EICs 206 could control a single OPA. DAC outputs 210 from each control EIC 206 are electrically connected to phase shifters 212. Input light 214 is optically coupled to an optical distribution network 216 (ODN) that optically couples the input light 214 to the phase shifters 212. The phase shifters 212 are optically coupled to antennas 218 that emit at least a portion of the input light 214. The input light 214 can be provided from a coherent optical source (e.g., a laser) that is coupled to (or integrated within) the PIC 204. As used herein, the term antenna refers to an element that is able to both emit an optical wave and receive an optical wave, and may also be referred to as an optical antenna.

Figure 2B:
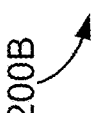
FIG. 2B is a schematic diagram of an example steerable optical system.

FIG. 2B shows an example SOS 200B comprising a first OPA 222A and a second OPA 222B each located on a PIC 224 and controlled by a control EIC 226 that is electrically connected to an interface bus 228. The control EIC 226 has DAC outputs 230 electrically connected to phase shifters 232 of the first OPA 222A, and DAC outputs 230 electrically connected to phase shifters 232 of the second OPA 222B. A first input light 234A is optically coupled to a first ODN 236A that optically couples the first input light 234A to phase shifters 232 of the first OPA 222A. The phase shifters 232 of the first OPA 222A are optically coupled to antennas 238 of the first OPA 222A. A second input light 234B is optically coupled to a second ODN 236B that optically couples the second input light 234B to phase shifters 232 of the second OPA 222B. The phase shifters 232 of the second OPA 222B are optically coupled to antennas 238 of the second OPA 222B.

In some examples, a single DAC output can be used to control multiple phase shifters, such as when the beamforming control implemented by one or more DAC outputs applied to one OPA can also be used for one or more additional OPAs.

Figure 2C:
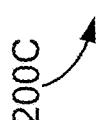
FIG. 2C is a schematic diagram of an example steerable optical system.

FIG. 2C shows an example SOS 200C comprising a first OPA 242A and a second OPA 242B each located on a PIC 244 and controlled by a control EIC 246 that is electrically connected to an interface bus 248. The control EIC 246 has DAC outputs 250 that are each electrically connected to phase shifters 252 of both the first OPA 242A and the second OPA 242B. A first input light 254A is optically coupled to a first ODN 256A that optically couples the first input light 254A to phase shifters 252 of the first OPA 242A. The phase shifters 252 of the first OPA 242A are optically coupled to antennas 258 of the first OPA 242A. A second input light 254B is optically coupled to a second ODN 256B that optically couples the second input light 254B to phase shifters 252 of the second OPA 242B. The phase shifters 252 of the second OPA 242B are optically coupled to antennas 258 of the second OPA 242B. In this example, each of the DAC outputs 250 are sent to at least one of the phase shifters 252 of the first OPA 242A and to at least one of the phase shifters 252 of the second OPA 242B.

Figure 3:
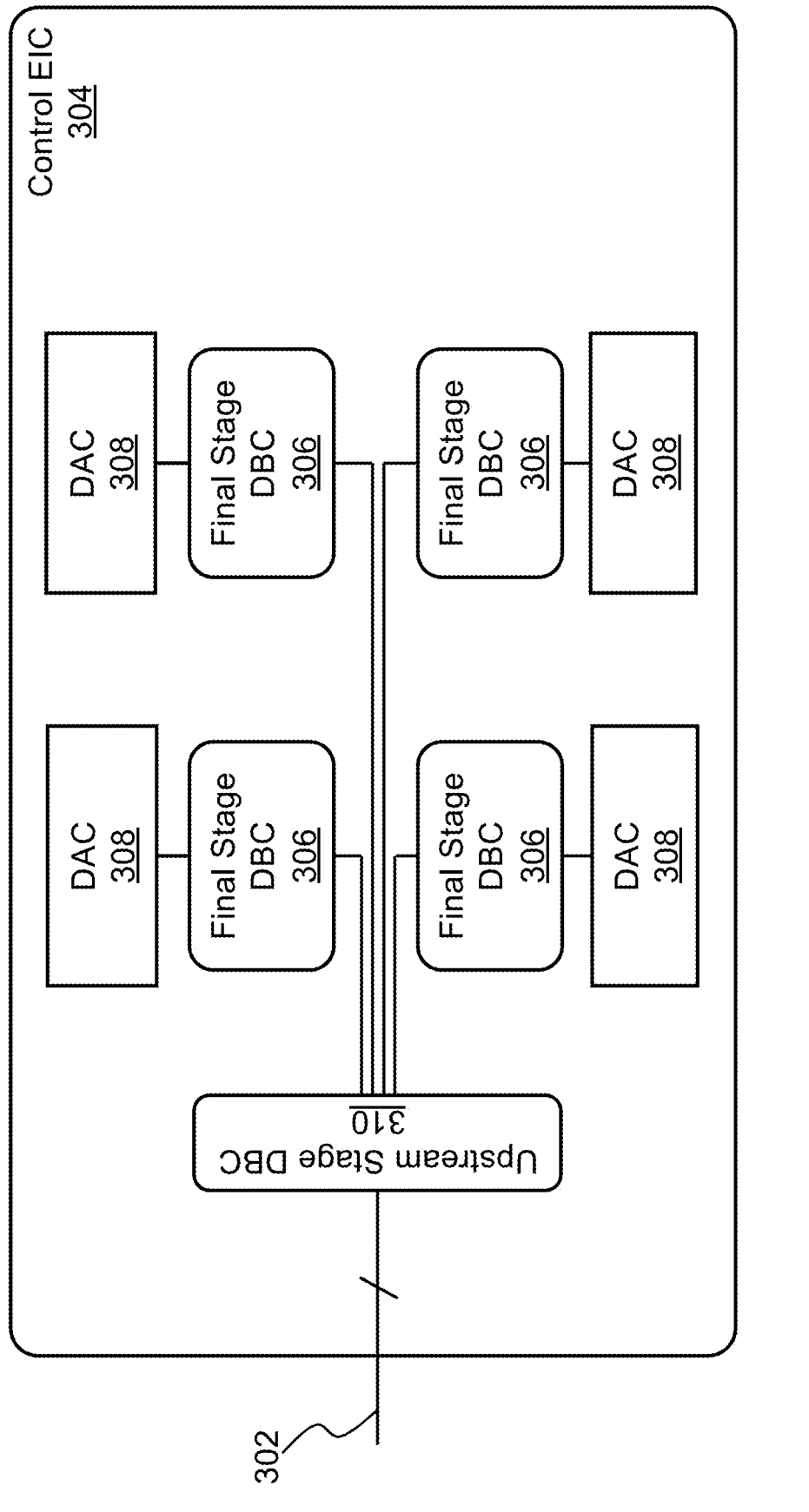
FIG. 3 is a schematic diagram of an example interface bus providing input to a control electronic integrated circuit.

FIG. 3 shows an example interface bus 302 providing input to a control EIC 304 that comprises final stage DBCs 306 for computing codes used as input to DACs 308 that serve as phase shifter drivers. Thus, the control EIC 304 serves as an integrated DBC that can be configured to use data compression algorithms to simplify (or in some cases remove the need for) the interface bus 302, thereby lowering communication power consumption and/or reducing communication time. The control EIC 304 can accept (possibly simple) input commands on a dual-purpose interface bus and an upstream stage DBC 310, such as a steering command directing one or more desired OPA tilt angles, focus distances, phase information, Zernike polynomial terms, calibration commands used for OPA factory tuning, or other terms that can be used to direct the emission of light from an OPA. The control EIC 304 could alternatively take no input whatsoever and run automatically based upon predetermined behavior, thereby allowing for the removal of the interface bus 302.

Figure 6:
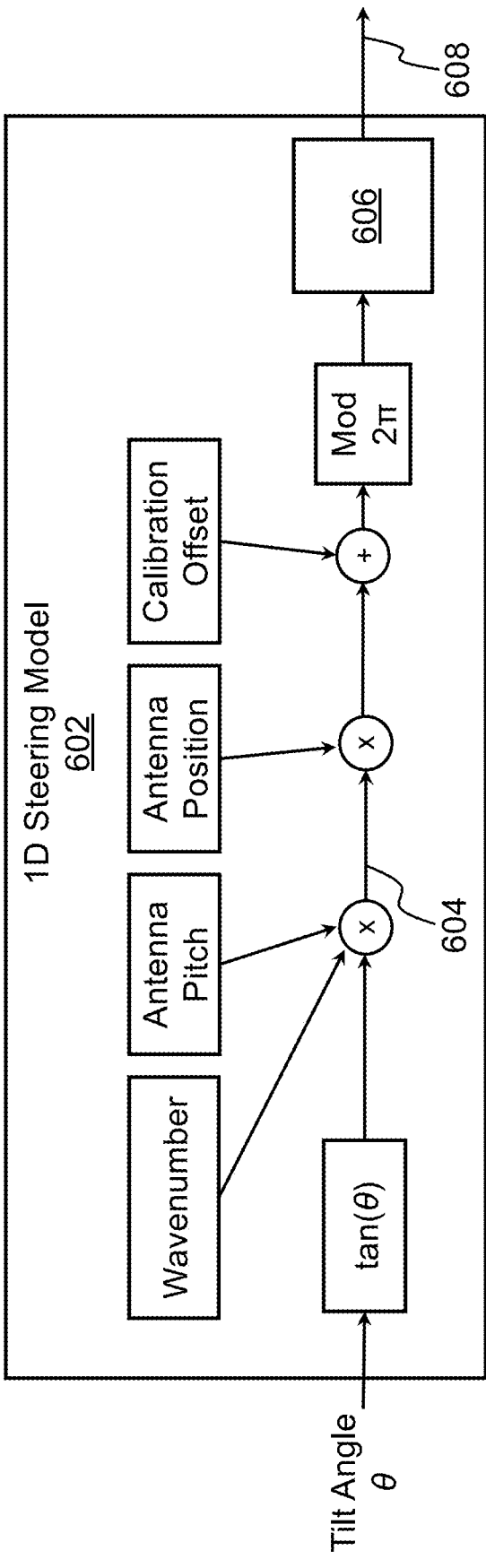
FIG. 6 is a schematic diagram of an example 1D steering model.
Figure 7:
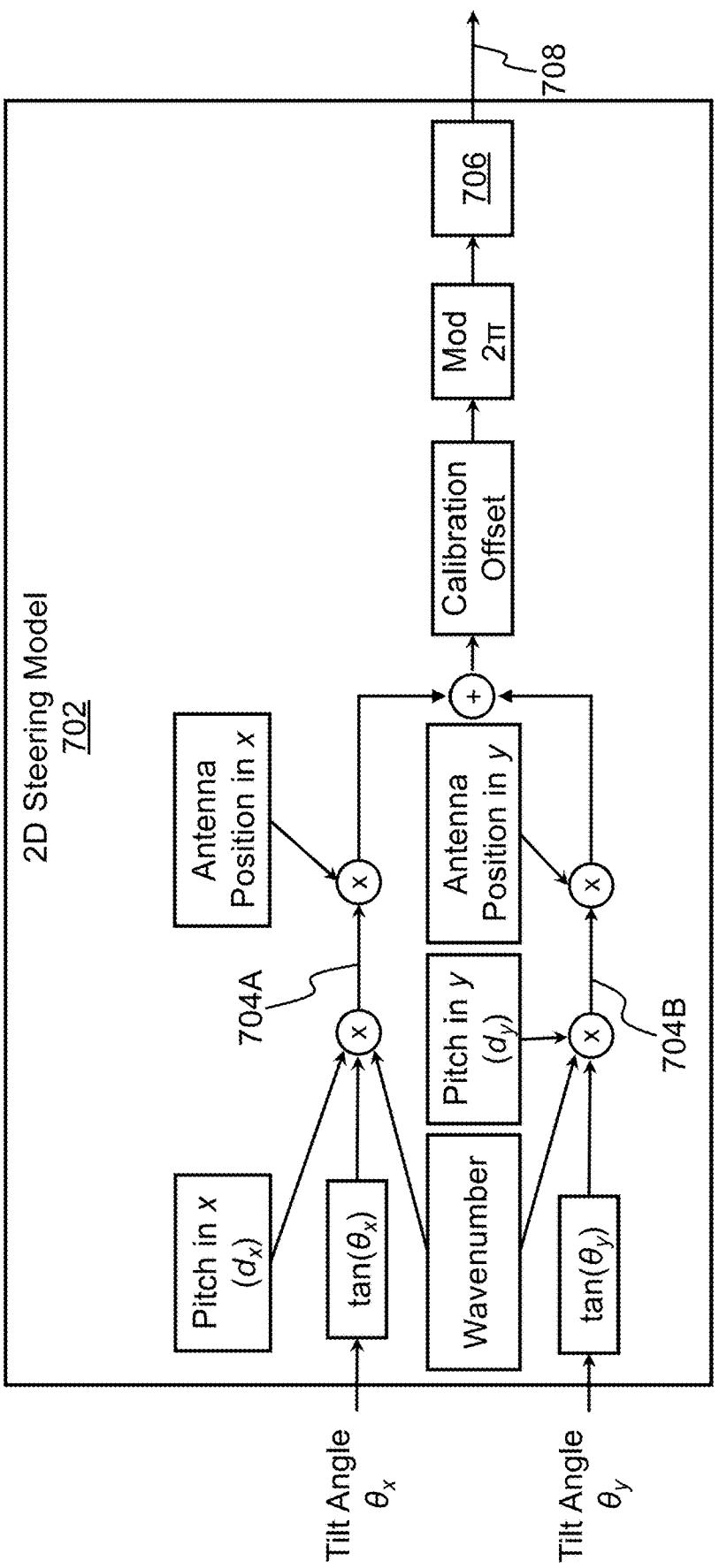
FIG. 7 is a schematic diagram of an example 2D steering model.

Referring again to FIG. 3, in some examples, the control EIC 304 can compute the appropriate input codes for the DACs 308 based at least in part upon a provided input command fed to a logically implemented computational phased array model (also referred to as a steering model). FIG. 6 shows an example of such a steering model for a single steering angle, defined in this example based on a tilt angle, $\theta$, though multiple simultaneous steering angles or multi-axis steering are also possible (e.g., FIG. 7 shows a model for 2D steering of an OPA, such as that shown in FIG. 5). An alternative architecture for the control EIC 304 can have a preprogrammed table of steering angles such that only a simple trigger signal (or alternatively, a predetermined number of input clock signals or a predefined time duration) is used as an indication of when to steer to the next angle. The logical computation blocks can be distributed across the control EIC 304 (e.g., in different stages of DBCs) so that the final logical computation of the appropriate input codes for DACs 308 occurs locally to those DACs 308. The control EIC 304 could also include a clock generator (e.g., instead of utilizing an external clock input).

Figure 4:
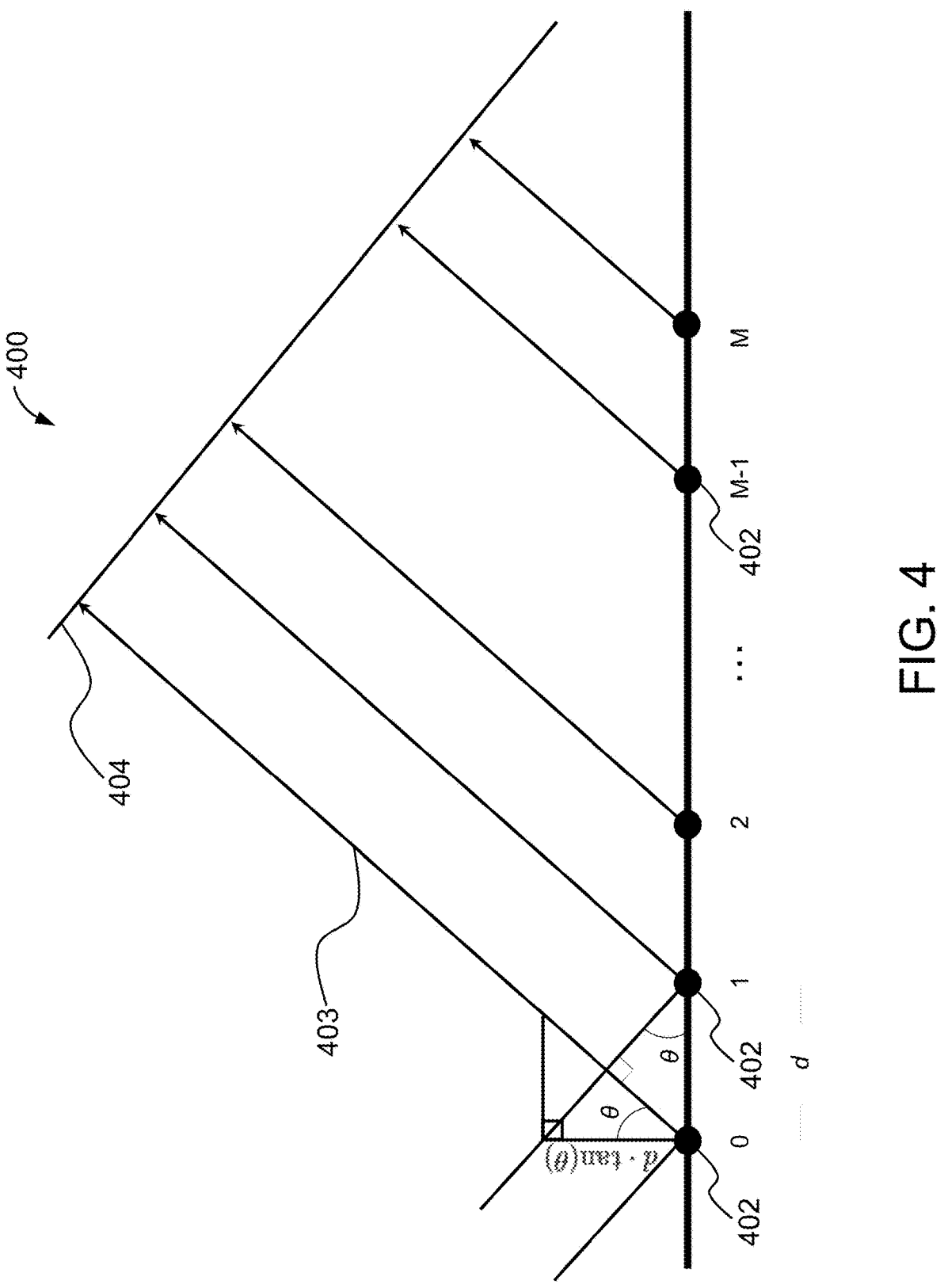
FIG. 4 is a schematic diagram of emission from an example 1D array of antennas in an optical phased array.

FIG. 4 shows an example 1D array of antennas 400 comprising antennas 402 that emit light 403 from an OPA (not shown). From an assumed tilt angle $\theta$ of a planar wavefront 404 that is formed by constructive and destructive interference of the light 403 emitted from the antennas 402, the relative phase difference between the light 403 being emitted from adjacent antennas 402 can be determined using the following expression: d·k·tan (θ). In this expression, d is the distance between the centers of adjacent antennas 402, and k is the wavenumber, which is equal to 2π/λ, where λ is the wavelength of the light 403. Alternatively, a normalized wavenumber, $k_{norm}$=k/(2π), can be used instead of the wavenumber k, which would enable a phase shift to be provided (and stored) as a value in the range between 0 and 1 instead of in the range between 0 and 21. While an ideal plane wave corresponds to an infinite number of antennas 402, in a practical implementation, there are a finite number of antennas, M, which yield a particular array pattern with a main lobe of a beam propagating in the direction of the tilt angle θ.

Figure 5:
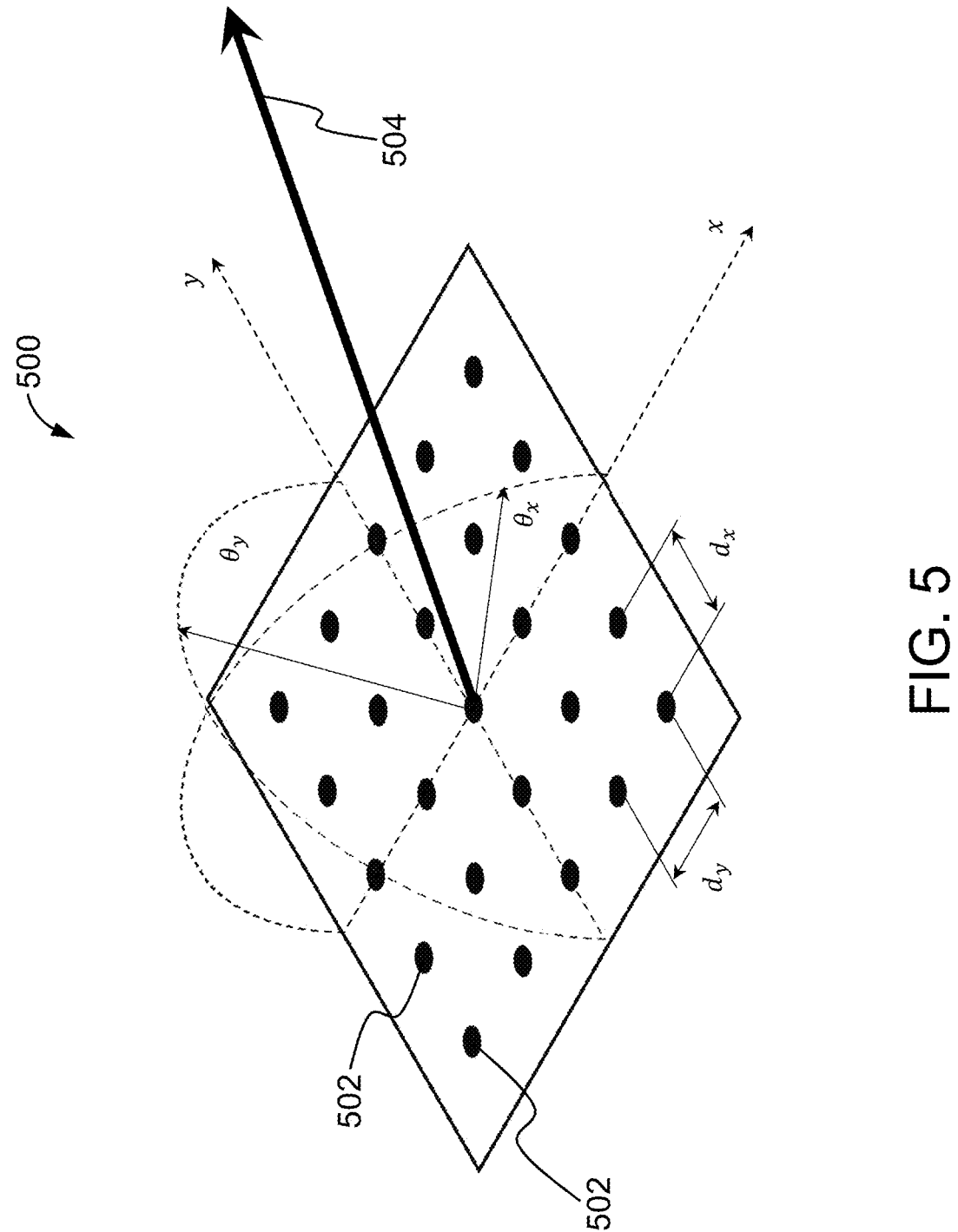
FIG. 5 is a schematic diagram of emission from an example 2D array of antennas in an optical phased array.

FIG. 5 shows an example 2D array of antennas 500 comprising antennas 502 that emit a beam with a main lobe propagating along a propagation axis 504 that can be characterized by two angles, $θ_x$ and $θ_y$. Along a first direction, the separation between two adjacent antennas 502 is given by dy. Along a second direction, perpendicular to the first direction, the separation between two adjacent antennas 502 is given by dy.

In general, other arrangement of antennas can include 1D arrays or 2D arrays of antennas that have any of a variety of emission characteristics. In some OPAs, the antennas are not point antennas that emit light from a single location but rather linear antennas that emit light over the length of a grating, for example, or other extended antennas that emit light over the shape of an emission area. Different arrangements of antennas will affect the shape of beam that is emitted, but similar computations can be performed to determine a relative phase shift between antenna elements based on information about a desired beam tilt angle.

One advantage of reduced data communication into an EIC can be a reduction of crosstalk and interference with other nearby sensitive circuitry, such as DAC circuits or receivers. In a compact LiDAR sensor, for example, the EIC may be physically co-located or co-integrated with sensitive transimpedance amplifiers. In some implementations, digital clocking in proximity to such circuits may be undesirable due to the noise caused by clock signals. By simplifying the interface to the EIC and performing DAC input code computation on-the-fly, the amount of digital switching performed for signals propagating over the interface bus can be substantially reduced. In some examples, the DBC is unclocked during a significant portion of the point-to-point steering time (e.g., when steering is performed according to the timing diagram shown in FIG. 11). Thus, the clock signal can be turned off at those times (e.g., during periodic silence time intervals), thereby allowing for less noisy operation of the noise-sensitive components during those times, as described in more detail below.

A control EIC comprising one or more DBCs can accept several different types of inputs from the interface bus. For example, a control EIC can receive on the interface bus a digital representation of the one or more desired steering angles, and then calculate the adjacent antenna phase differences to generate the one or more specified tilt angles. In some examples, a control EIC can receive on the interface bus a digital representation of the adjacent antenna phase differences to reduce the amount of computation necessary on the control EIC. Furthermore, a control EIC can have a memory table storing a list of possible steering angles or adjacent antenna phase differences, and advance to the next steering angle or phase difference based upon a trigger input on the interface bus. In some examples, a control EIC calculates the next steering angle based upon a given representation of angular resolution from the interface bus, or from stored memory integrated with or otherwise coupled to the control EIC. The memory can be implemented, for example, using flip-flops, a register file, static random-access memory (SRAM), and/or dynamic random-access memory (DRAM).

Figure 9:
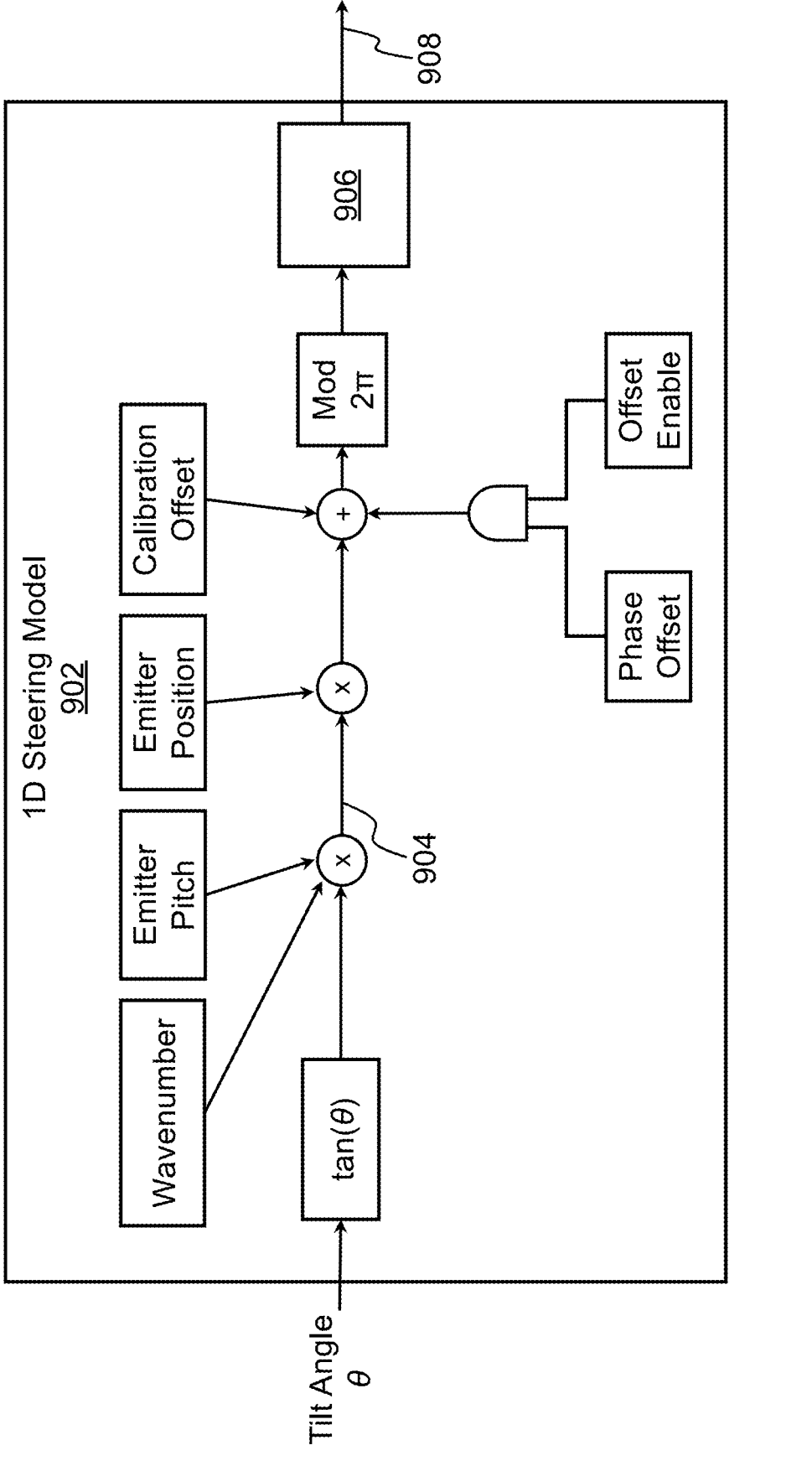
FIG. 9 is a schematic diagram of an example 1D steering model.

FIG. 6 shows an example 1D steering model 602 that may be performed on a control EIC (e.g., by the final stage DBCs 306 shown in FIG. 3) used to control a 1D array of antennas (e.g., the 1D array of antennas 400 shown in FIG. 4). In this example, the 1D steering model 602 takes a tilt angle θ of an OPA as an input. The 1D steering model 602 calculates the tangent of the tilt angle θ (e.g., via a look-up-table) and multiplies the result by the wavenumber and the antenna pitch (i.e., the distance between adjacent antenna elements) to determine an adjacent antenna phase difference 604. An alternative version of the 1D steering model 602 could directly accept the adjacent antenna phase difference 604 as an input. Another alternative version could implement multi-axis steering if the OPA supports it, such as with a 2D array of antennas (e.g., the 2D array of antennas 500 shown in FIG. 5). For each antenna, the adjacent antenna phase difference 604 is multiplied by the antenna position. The resulting product is summed with the calibration offset for the antenna to calculate a phase, and the phase mod 2π is provided as input to a phase-to-DAC input code converter 606 that generates a DAC input code 608 corresponding to the antenna being considered. The calibration offset can be programmed to change based on an appropriate phase offset used for wavelength-based steering according to a time-division multiplexing pattern, or a separate phase offset that can be enabled or disabled as needed can be added in addition to the calibration offset (e.g., as shown in FIG. 9).

FIG. 7 shows an example 2D steering model 702 that may be performed on a control EIC (e.g., by the final stage DBCs 306 shown in FIG. 3) used to control a 2D array of antennas (e.g., the 2D array of antennas 500 shown in FIG. 5). In this example, the 2D steering model 702 takes two input tilt angles of an OPA as inputs. For each of the two input tilt angles, the 2D steering model 702 calculates a first adjacent antenna phase difference 704A and a second adjacent antenna phase difference 704B in a manner similar to the computation of the 1D steering model 602 shown in FIG. 6. An alternative version of the 2D steering model 702 could directly accept one or both adjacent antenna phase differences as inputs. For each antenna and each direction, the adjacent antenna phase difference is multiplied by the respective antenna position along that direction (e.g., first adjacent antenna phase difference 704A is multiply by the antenna position in x, and the second adjacent antenna phase difference 704B is multiplied by the antenna position in y). The resulting products are summed together and added with a calibration offset for the antenna to calculate a phase, and the phase mod 2π is provided as input to a phase-to-DAC input code converter 706 that generates a DAC input code 708 corresponding to the antenna being considered.

Some SOSs are configured to perform calibration procedures to correct for fabrication errors (e.g., to calibrate one or more OPAs of the SOS). In some examples, a DBC can include a calibration mode to provide functional and speed improvements to SOS calibration. For example, improvements to the speed of calibration can be achieved by including on-board logic that automatically sequences through the calibration sequence of an OPA. Such a calibration sequence may be internally timed, synchronized to an external trigger input, or generated by an external trigger output.

In general, an optical switch is not necessarily required to implement a time-division multiplexed architecture. For example, each optical source in such an time-division multiplexed SOS can be optically coupled to its own dedicated OPA that is only active when the corresponding optical source is active.

Figure 8A:
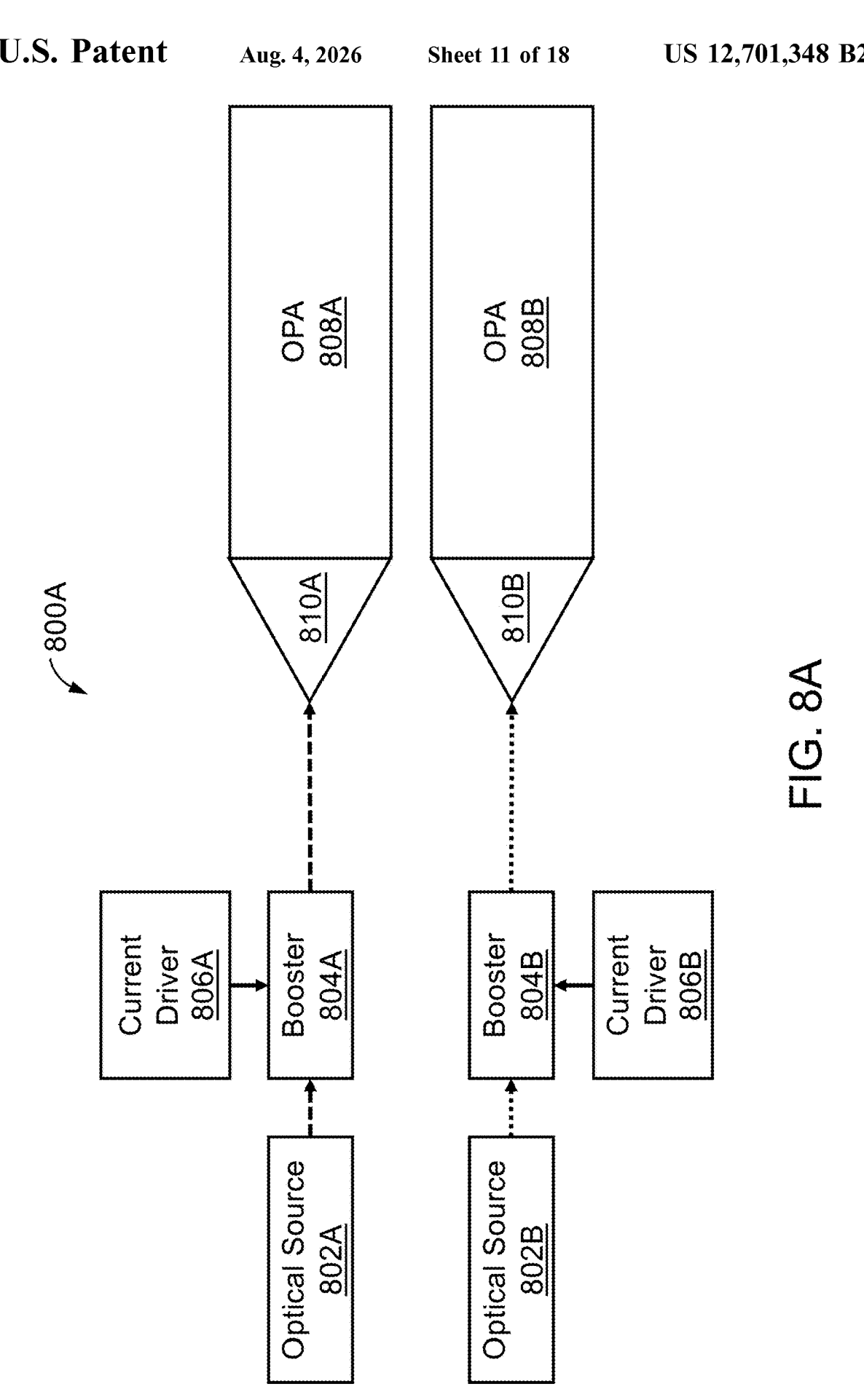
FIG. 8A is a schematic diagram of an example time-division multiplexed steerable optical system.

FIG. 8A shows an example time-division multiplexed SOS 800A comprising a respective OPA for each optical source. In this example, a first optical source 802A is optically coupled to a first booster 804A (e.g., an optical amplifier) that amplifies the optical power it receives from the first optical source 802A based at least in part on one or more control signals provided by a first current driver 806A. A second optical source 802B is optically coupled to a second booster 804B that amplifies the optical power it receives from the second optical source 802B based at least in part on one or more control signals provided by a second current driver 806B. The first current driver 806A and the second current driver 806B each provide control signals that control the amount of optical power amplification provided by their respective boosters. The first booster 804A is optically coupled from its optical source port to a first OPA 808A by a first ODN 810A, and the second booster 804B is optically coupled from its optical source port to a second OPA 808B by a second ODN 810B.

Referring again to FIG. 8A, a single input/single output optical coupler (e.g., a waveguide) optically couples the output of the first booster 804A and the output of the second booster 804B to respective ODNs (e.g., a binary tree of 1×2 splitters, also called a binary splitter ODN) that are each optically coupled to an array of phase shifters and optical antennas of their respective OPA. This type of architecture benefits from a simpler control scheme, where toggling the current drivers on and off can be used to toggle between the first optical source 802A and the second optical source 802B emitting light from their respective OPAs. For example, over a first duration of time, the current drivers can be configured such that the first booster 804A amplifies the optical power it receives from the first optical source 802A while the second booster 804B does not substantially amplify the optical power it receives from the second optical source 802B. Similarly, over a second duration of time, the current drivers can be configured such that the first booster 804A does not substantially amplify the optical power it receives from the first optical source 802A while the second booster 804B amplifies the optical power it receives from the second optical source 802B. However, this type of architecture may have an increased footprint due to the additional OPAs utilized. This type of architecture may also be generalized to include N OPAs (i.e., one OPA for each of the N lasers in the SOS).

Figure 8B:
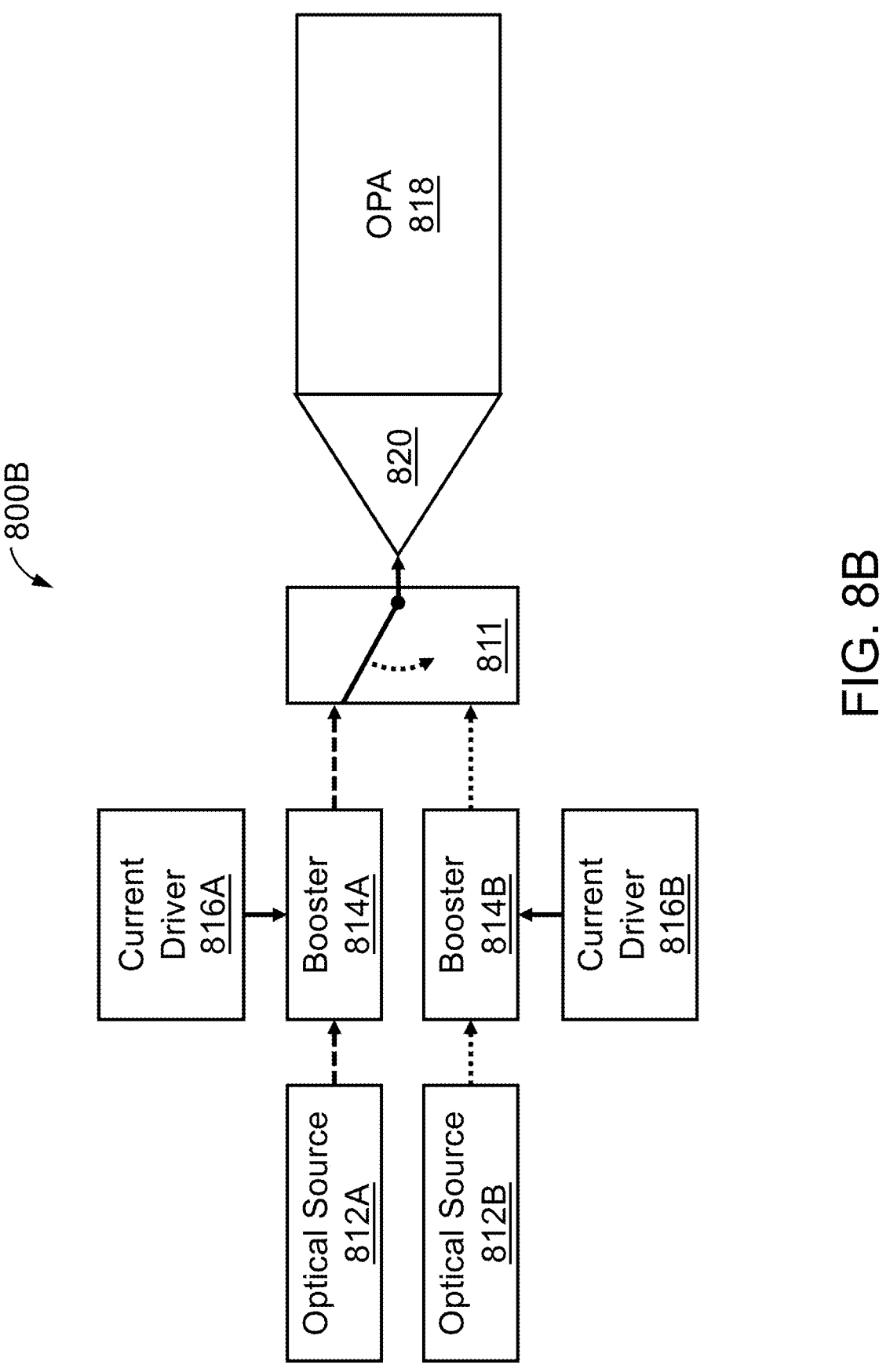
FIG. 8B is a schematic diagram of an example time-division multiplexed steerable optical system.

FIG. 8B shows an example time-division multiplexed SOS 800B comprising an optical switch 811 that can be utilized to reduce the number of OPAs, thereby reducing the footprint of the time-division multiplexed SOS 800B. A first optical source 812A is optically coupled to a first booster 814A that amplifies the optical power it receives from the first optical source 812A based at least in part on one or more control signals provided by a first current driver 816A. A second optical source 812B is optically coupled to a second booster 814B that amplifies the optical power it receives from the second optical source 812B based at least in part on one or more control signals provided by a second current driver 816B. The first booster 814A and the second booster 814B are each optically coupled from their respective optical source ports to the optical switch 811. In this example, the optical switch 811 is an active 2×1 switch that selectively optically couples one of two optical inputs to an ODN 820 that is optically coupled to an OPA 818 that emits the selected optical input. The state of the optical switch 811 can be adjusted based on the optical source that is active. For time-division multiplexed SOSs comprising N lasers, the optical switch 811 can be generalized to be an N×1 switch. The design of the optical switch 811 can be based at least in part on the optical power that is desired, such as for long-range LiDAR systems. In some examples, it can be challenging to design the optical switch 811 such that it can operate with higher optical powers.

To overcome some of the design challenges that can be associated with an optical switch (e.g., the optical switch 811 shown in FIG. 8B), a passive optical coupler can be utilized.

Figure 8C:
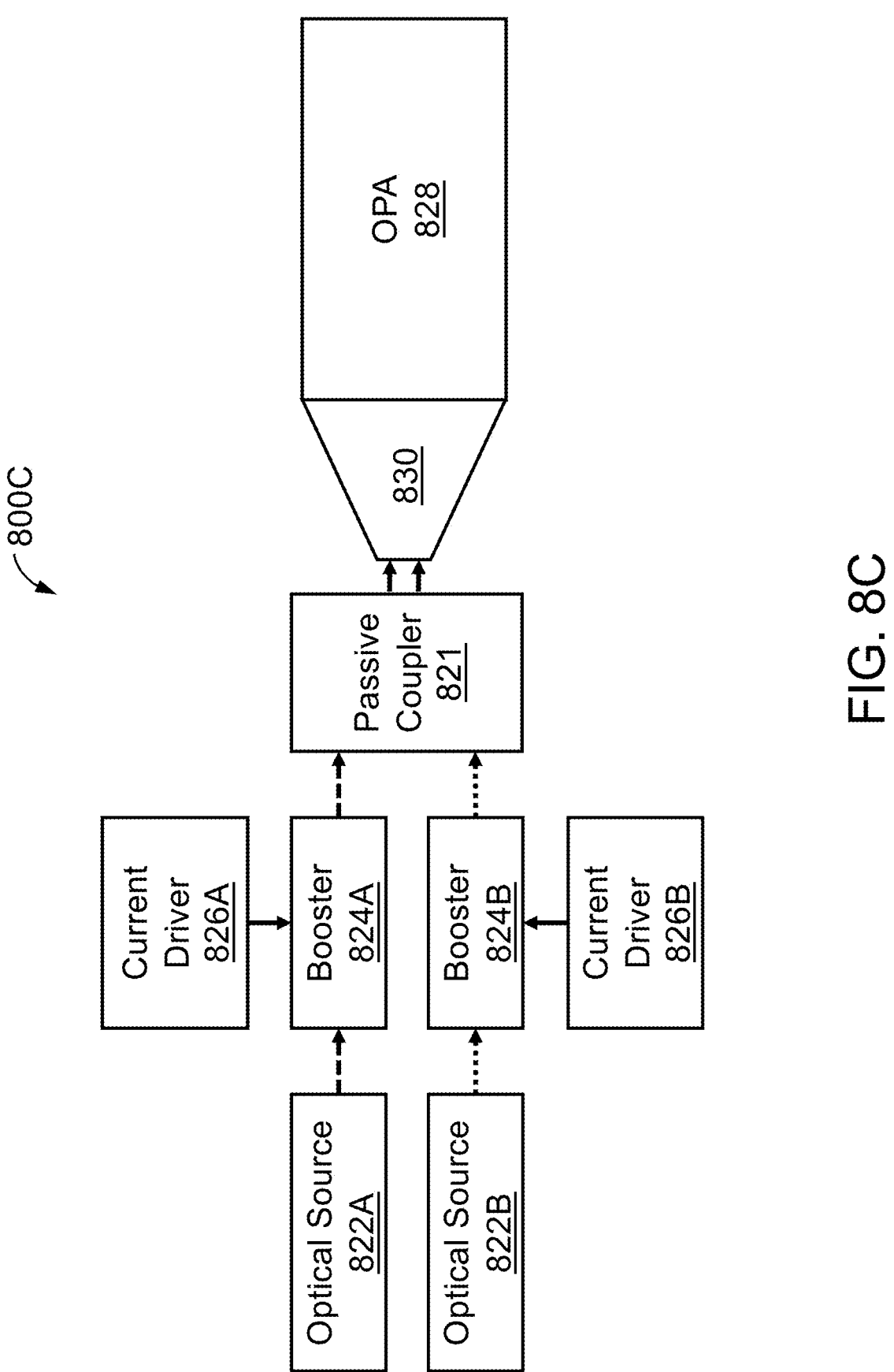
FIG. 8C is a schematic diagram of an example time-division multiplexed steerable optical system.

FIG. 8C shows an example time-division multiplexed SOS 800C comprising a passive coupler 821 (also referred to as a passive multiport optical coupler, or as a passive optical combiner). A first optical source 822A is optically coupled to a first booster 824A that amplifies the optical power it receives from the first optical source 822A based at least in part on one or more control signals provided by a first current driver 826A. A second optical source 822B is optically coupled to a second booster 824B that amplifies the optical power it receives from the second optical source 822B based at least in part on one or more control signals provided by a second current driver 826B. The first booster 824A and the second booster 824B are each optically coupled from their respective optical source ports to respective input ports of the passive coupler 821. In this example, the passive coupler 821 is a 2×2 coupler that optically couples its two input ports to two output ports of the passive coupler 821, and the two output ports of the passive coupler 821 are optically coupled to two input ports of an ODN 830. The two input ports of the ODN 830 are optically coupled to two or more output ports of the ODN 830 that are optically coupled to phase shifters (not shown) of an OPA 828. In some examples, each of the two or more output ports of the ODN 830 is coupled to a single one of the input ports of the ODN 830. One or more control signals applied to phase shifters in the OPA 828 can select whether a beam is formed with light originating from the first optical source 822A or with light originating from the second optical source 822B.

Referring again to FIG. 8C, a first of the two input ports of the passive coupler 821 is optically coupled to a first and a second of the two output ports of the passive coupler 821 over different respective propagation paths having a first relative optical phase shift. Additionally, a second of the two input ports of the passive coupler 821 is optically coupled to the first and second of the two output ports of the passive coupler 821 over different respective propagation paths having a second relative optical phase shift different from the first relative optical phase shift.

Referring again to FIG. 8C, for time-division multiplexed SOSs comprising N lasers, the passive coupler 821 can be an N×N coupler (also called an N×N combiner). In such examples, the N lasers can be passively combined with the passive coupler 821 and optically coupled to the ODN 830. In some examples, the ODN 830 is a modified binary splitter ODN that has been modified such that a selected number of initial stages of the binary splitter ODN are removed in order to optically couple the OPD 830 and OPA 828 with the N output ports of the passive coupler 821. For example, if the first stage is removed, then the ODN 830 can have two input ports, while removing the first two stages can provide four input ports. This technique of using a N×N coupler may reduce optical losses (e.g., resulting in losses lower than 50%, 20%, 10%, 1%, or essentially lossless) compared to an N×1 passive combiner. If a 2×1 passive coupler is used to optically couple a full binary splitter ODN (i.e., with one input port), there is an inherent 3 dB loss from the optical source port of the booster to the output of the 2×1 passive coupler. Similarly, a 4×1 passive coupler would have a 6 dB loss, and so forth.

Referring again to FIG. 8C, to account for the optical phase difference in the two optical signals transmitted by the output ports of the passive coupler 821, the phase shifter settings in the OPA 828 can be adjusted based at least in part on whether the first optical source 822A or the second optical source 822B is active. Specifically, the phase shifter settings can be adjusted to ensure that the light in each waveguide of the OPA 828, after the phase shifters, has the appropriate phase relationship to produce a desired emission pattern in the far field. As an example, a phase ramp between all adjacent elements in the OPA 828 will produce a single spot at a particular angular location in the far field. Fortunately, an entirely new phase shifter calibration table for each input port of an N×N passive coupler may not be required. Information representing the optical transfer function of the N×N passive coupler provides a description of the particular phase adjustments that can be applied to specific phase shifters in the OPA 828 to ensure the desired far field pattern is achieved. For example, a 2×2 multimode interference passive coupler has a 90° phase difference between its two output ports, which can be applied to the relevant phase shifters in the OPA 828. Thus, using a predetermined phase relationship, only a calibration for the single input optical source channel is used in this example and a 1D steering model (e.g., as shown in FIG. 9) can be followed. The 1D steering model can include a phase shifter specific phase offset term, which is determined from the transfer function of the N×N passive coupler and a measured calibration offset term, so as to calculate the appropriate actuation signals for every emission angle and input optical source channel.

FIG. 9 shows an example 1D steering model 902 that can be executed by a digital beamforming controller. Compared to the 1D steering model 602 shown in FIG. 6, the 1D steering model 902 includes a phase offset term to support time-division multiplexing where the output from an N×N coupler is used as input to an OPA (e.g., the OPA 828 shown in FIG. 8C). In this example, the 1D steering model 902 takes an input tilt angle θ of an OPA as an input. The 1D steering model 902 calculates the tangent of the input tilt angle θ (e.g., via a look-up-table) and multiplies the result by the wavenumber and the antenna pitch (i.e., the distance between adjacent antenna elements) to determine an adjacent antenna phase difference 904. In order to calculate a phase for each antenna, the adjacent antenna phase difference 904 is multiplied by the antenna position, and the resulting product is summed with both (1) a calibration offset for the antenna and (2) the output of an AND gate that receives a phase offset and an offset enable signal as inputs. The phase mod 2π is provided as input to a phase-to-DAC input code converter 906 that generates a DAC input code 908 corresponding to the antenna being considered.

Figure 10A:
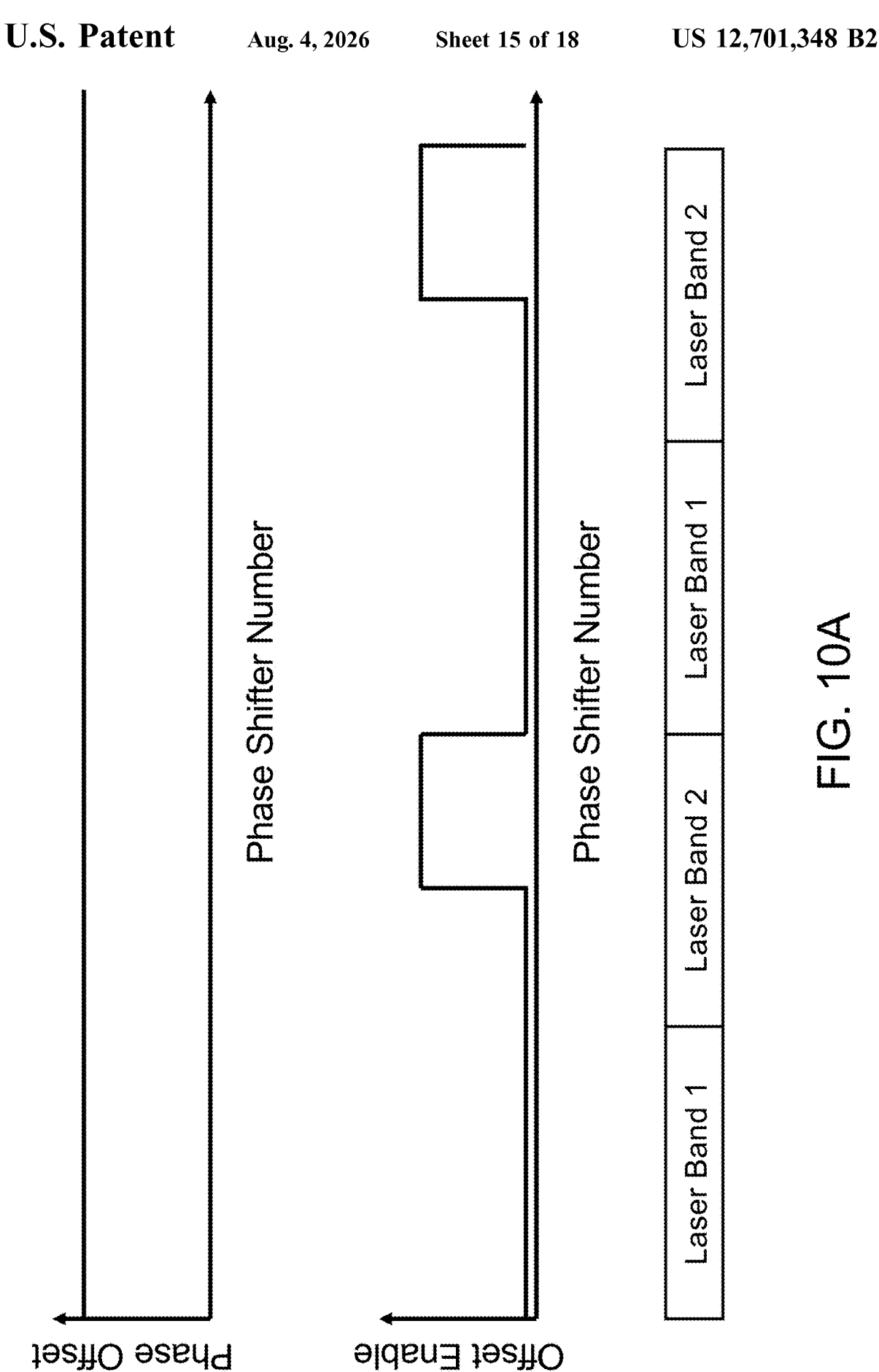
FIGS. 10A and 10B are plots of phase offset as a function of time and offset enable as a function of time.

FIG. 10A shows an example implementation of the additional phase offset logic present in the 1D steering model 902 shown in FIG. 9, as applied to an example time-division multiplexed SOS comprising a 2×2 passive coupler. In this example, the phase offset is held at a constant value and is only enabled by the offset enable signal for the relevant phase shifters.

Figure 10B:
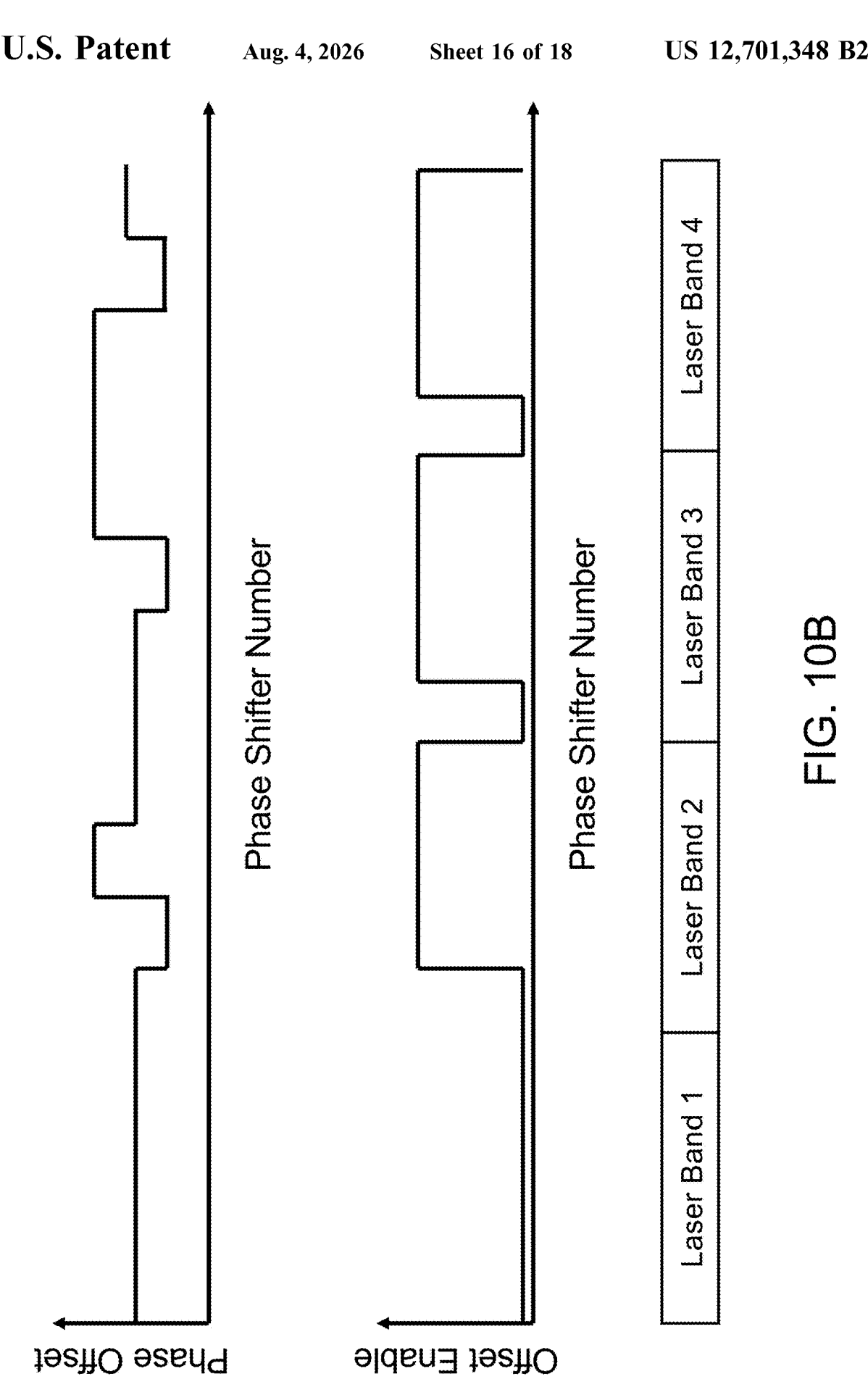

FIG. 10B shows an example implementation of the additional phase offset logic present in the 1D steering model 902 shown in FIG. 9, as applied to an example time-division multiplexed SOS comprising a 4×4 passive coupler. In this example, the phase offset can be updated in order to apply the proper signal to all of the phase shifters in the array of phase shifters. For example, during a given laser band (i.e., a duration of time over which a given laser is active), the phase offset can be varied.

An added benefit of a time-division multiplexed SOS is that a laser in an inactive channel is afforded additional time to have its wavelength stabilize before it is activated. This can be particularly useful for a coherent LiDAR system, where it can be desirable for the frequency of the laser to be well-controlled during operation. To allow for this additional settling time, the active lasers can be alternated between the two bands instead of sweeping through an entire band before switching to the other. An example timing diagram is shown in FIG. 11, which shows that while one channel is active, the laser from the other channel is tuning and settling to the desired wavelength. An implementation of this timing diagram in a time-division multiplexed SOS is shown in FIG. 12 to demonstrate how the emitted wavelengths alternate between the two channels.

FIG. 11 shows an example timing diagram for time-division multiplexing comprising alternating wavelength bands in order to allow for additional optical source settling time in an example time-division multiplexed SOS comprising two optical sources and two boosters. In this example, a first optical source tunes and settles to an output frequency while a second optical source is amplified by a second booster. The boosters turn on and off so as to enable time-division multiplexing between the first optical source and the second optical source.

Figure 12:
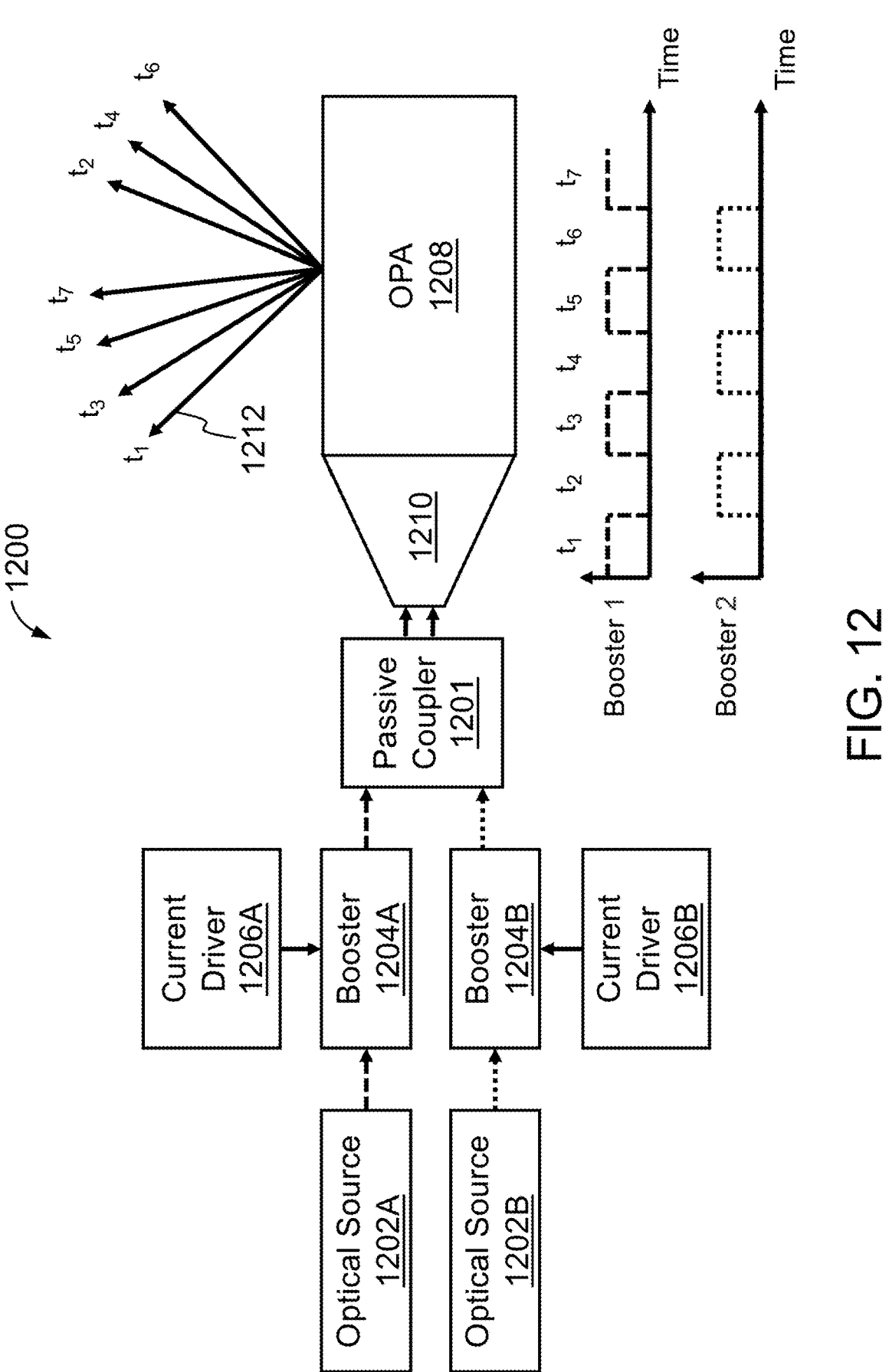
FIG. 12 is a schematic diagram of an example time-division multiplexed steerable optical system.

FIG. 12 shows an example time-division multiplexed SOS 1200 comprising a passive coupler 1201. A first optical source 1202A is optically coupled to a first booster 1204A that amplifies the optical power it receives from the first optical source 1202A based at least in part on one or more control signals provided by a first current driver 1206A. A second optical source 1202B is optically coupled to a second booster 1204B that amplifies the optical power it receives from the second optical source 1202B based at least in part on one or more control signals provided by a second current driver 1206B. The first booster 1204A and the second booster 1204B are each optically coupled to the passive coupler 1201 by their respective optical source ports. In this example, the passive coupler 1201 is a 2×2 passive coupler that optically couples light at its two input ports to two output ports of the passive coupler 1202 that are optically coupled into an OPA 1208 by an ODN 1210. The time-division multiplexed SOS 1200 can be configured to emit several wavelengths 1212 over time (e.g., according to the timing diagram shown in FIG. 11). The different wavelengths 1212 emitted at different times can have different tilt angles of emission.

In one aspect, in general, an apparatus comprises: a plurality of optical source ports, each configured to provide a respective optical wave that is tuned over different respective wavelengths, and provided within different respective time slots; at least one optical phased array comprising a plurality of optical phase shifters, and a plurality of optical grating antennas, including two or more optical grating antennas each coupled to a different respective one of the optical phase shifters; at least one optical distribution network (ODN) comprising: a plurality of ODN input ports, and a plurality of ODN output ports, including two or more ODN output ports each coupled to a different respective one of the optical phase shifters, wherein each of the two or more ODN output ports is coupled to a single one of the plurality of ODN input ports; and at least one passive multiport optical coupler (PMOC) comprising: a plurality of PMOC input ports, including two or more PMOC input ports each coupled to a different respective one of the optical source ports, and a plurality of PMOC output ports, including two or more PMOC output ports each coupled to a different respective one of the plurality of ODN input ports, wherein a first of the two or more PMOC input ports is coupled to a first and second of the two or more PMOC output ports over different respective propagation paths having a first relative optical phase shift, and a second of the two or more PMOC input ports is coupled to the first and second of the two or more PMOC output ports over the different respective propagation paths having a second relative optical phase shift different from the first relative optical phase shift.

In another aspect, in general, a method for steering light comprises: providing, from a plurality of optical source ports, a respective optical wave that is tuned over different respective wavelengths, within different respective time slots; emitting at least a portion of the light from at least one optical phased array comprising a plurality of optical phase shifters, and a plurality of optical grating antennas, including two or more optical grating antennas each coupled to a different respective one of the optical phase shifters; distributing at least a portion of the light using at least one optical distribution network (ODN) comprising: a plurality of ODN input ports, and a plurality of ODN output ports, including two or more ODN output ports each coupled to a different respective one of the optical phase shifters, wherein each of the two or more ODN output ports is coupled to a single one of the plurality of ODN input ports; and coupling at least a portion of the light using at least one passive multiport optical coupler (PMOC) comprising: a plurality of PMOC input ports, including two or more PMOC input ports each coupled to a different respective one of the optical source ports, and a plurality of PMOC output ports, including two or more PMOC output ports each coupled to a different respective one of the plurality of ODN input ports, wherein a first of the two or more PMOC input ports is coupled to a first and second of the two or more PMOC output ports over different respective propagation paths having a first relative optical phase shift, and a second of the two or more PMOC input ports is coupled to the first and second of the two or more PMOC output ports over the different respective propagation paths having a second relative optical phase shift different from the first relative optical phase shift.

In another aspect, in general, an apparatus comprises: a plurality of optical source ports, each configured to provide a respective optical wave that is tuned over different respective wavelengths, and provided within different respective time slots of a plurality of time slots; at least one optical phased array comprising a plurality of optical phase shifters, and a plurality of optical grating antennas, including two or more optical grating antennas each coupled to a different respective one of the optical phase shifters; at least one optical distribution network (ODN) comprising: one or more ODN input ports, and a plurality of ODN output ports, including two or more ODN output ports each coupled to a different respective one of the optical phase shifters; and at least one optical coupler (OC) comprising: one or more OC input ports, including at least one OC input port coupled to one of the optical source ports, and one or more OC output ports, including at least one OC output port coupled to one of the one or more ODN input ports; wherein a single period of a repeating pattern of wavelengths are provided from the plurality of optical source ports in the plurality of time slots, the plurality of time slots comprising: a first time slot in which a first of the plurality of optical source ports provides an optical wave tuned to a first wavelength, a second time slot, starting at or after an end of the first time slot, in which a second of the plurality of optical source ports provides an optical wave tuned to a second wavelength different from the first wavelength, and a third time slot, starting at or after an end of the second time slot, in which the first of the plurality of optical source ports provides an optical wave tuned to a third wavelength between the first wavelength and the second wavelength.

In another aspect, in general, a method for steering light comprises: providing, from a plurality of optical source ports, a respective optical wave that is tuned over different respective wavelengths, within different respective time slots of a plurality of time slots; emitting at least a portion of the light from at least one optical phased array comprising a plurality of optical phase shifters, and a plurality of optical grating antennas, including two or more optical grating antennas each coupled to a different respective one of the optical phase shifters; distributing at least a portion of the light using at least one optical distribution network (ODN) comprising: one or more ODN input ports, and a plurality of ODN output ports, including two or more ODN output ports each coupled to a different respective one of the optical phase shifters; and coupling at least a portion of the light using at least one optical coupler (OC) comprising: one or more OC input ports, including at least one OC input port coupled to one of the optical source ports, and one or more OC output ports, including at least one OC output port coupled to one of the one or more ODN input ports; wherein a single period of a repeating pattern of wavelengths are provided from the plurality of optical source ports in the plurality of time slots, the plurality of time slots comprising: a first time slot in which a first of the plurality of optical source ports provides an optical wave tuned to a first wavelength, a second time slot, starting at or after an end of the first time slot, in which a second of the plurality of optical source ports provides an optical wave tuned to a second wavelength different from the first wavelength, and a third time slot, starting at or after an end of the second time slot, in which the first of the plurality of optical source ports provides an optical wave tuned to a third wavelength between the first wavelength and the second wavelength.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus comprising:
   a plurality of optical source ports, each configured to provide a respective optical wave that is tuned over different respective wavelengths, and provided within different respective time slots;
   at least one optical phased array comprising a plurality of optical phase shifters, and a plurality of optical grating antennas, including two or more optical grating antennas each coupled to a different respective one of the optical phase shifters;

at least one optical distribution network (ODN) comprising:

a plurality of ODN input ports, and a plurality of ODN output ports, including two or more ODN output ports each coupled to a different respective one of the optical phase shifters, wherein each of the two or more ODN output ports is coupled to a single one of the plurality of ODN input ports; and at least one passive multiport optical coupler (PMOC) comprising:

a plurality of PMOC input ports, including two or more PMOC input ports each coupled to a different respective one of the optical source ports, and a plurality of PMOC output ports, including two or more PMOC output ports each coupled to a different respective one of the plurality of ODN input ports, wherein a first of the two or more PMOC input ports is coupled to a first and second of the two or more PMOC output ports over different respective propagation paths having a first relative optical phase shift, and a second of the two or more PMOC input ports is coupled to the first and second of the two or more PMOC output ports over the different respective propagation paths having a second relative optical phase shift different from the first relative optical phase shift.

2. The apparatus of claim 1, further comprising circuitry configured to provide a control signal to at least a first of the optical phase shifters for controlling an optical phase shift imposed by the first of the optical phase shifters.

3. The apparatus of claim 2, wherein the control signal is based at least in part on the first relative optical phase shift and the second relative optical phase shift.

4. The apparatus of claim 2, wherein the control signal is based at least in part on the first relative optical phase shift during a first of the time slots associated with a first of the optical source ports, and is based at least in part on the second relative optical phase shift during a second of the time slots associated with a second of the optical source ports.

5. The apparatus of claim 1, wherein each of the two or more PMOC input ports is coupled to all of the two or more PMOC output ports.

6. The apparatus of claim 1, wherein each of the two or more PMOC input ports is coupled to at least one of the two or more PMOC output ports with an optical loss of less than 50%.

7. The apparatus of claim 6, wherein each of the two or more PMOC input ports is coupled to at least one of the two or more PMOC output ports with an optical loss of less than 20%.

8. The apparatus of claim 1, wherein the different respective wavelengths for different optical source ports are not overlapping.

9. The apparatus of claim 1, wherein the different respective time slots for different optical source ports are not overlapping.

10. The apparatus of claim 1, further comprising a plurality of optical sources coupled to different ones of the plurality of optical source ports, each optical source configured to provide one of the respective optical waves.

11. A method for steering light, the method comprising:

providing, from a plurality of optical source ports, a respective optical wave that is tuned over different respective wavelengths, within different respective time slots;

emitting at least a portion of the light from at least one optical phased array comprising a plurality of optical phase shifters, and a plurality of optical grating antennas, including two or more optical grating antennas each coupled to a different respective one of the optical phase shifters;

distributing at least a portion of the light using at least one optical distribution network (ODN) comprising:

a plurality of ODN input ports, and a plurality of ODN output ports, including two or more ODN output ports each coupled to a different respective one of the optical phase shifters, wherein each of the two or more ODN output ports is coupled to a single one of the plurality of ODN input ports; and coupling at least a portion of the light using at least one passive multiport optical coupler (PMOC) comprising:

a plurality of PMOC input ports, including two or more PMOC input ports each coupled to a different respective one of the optical source ports, and a plurality of PMOC output ports, including two or more PMOC output ports each coupled to a different respective one of the plurality of ODN input ports, wherein a first of the two or more PMOC input ports is coupled to a first and second of the two or more PMOC output ports over different respective propagation paths having a first relative optical phase shift, and a second of the two or more PMOC input ports is coupled to the first and second of the two or more PMOC output ports over the different respective propagation paths having a second relative optical phase shift different from the first relative optical phase shift.

12. The method of claim 11, further comprising providing a control signal to at least a first of the optical phase shifters for controlling an optical phase shift imposed by the first of the optical phase shifters.

13. The method of claim 12, wherein the control signal is based at least in part on the first relative optical phase shift and the second relative optical phase shift.

14. The method of claim 12, wherein the control signal is based at least in part on the first relative optical phase shift during a first of the time slots associated with a first of the optical source ports, and is based at least in part on the second relative optical phase shift during a second of the time slots associated with a second of the optical source ports.

15. The method of claim 11, wherein the different respective time slots for different optical source ports are not overlapping.

16. An apparatus comprising:

a plurality of optical source ports, each configured to provide a respective optical wave that is tuned over different respective wavelengths, and provided within different respective time slots of a plurality of time slots;

at least one optical phased array comprising a plurality of optical phase shifters, and a plurality of optical grating antennas, including two or more optical grating antennas each coupled to a different respective one of the optical phase shifters;

at least one optical distribution network (ODN) comprising:
  one or more ODN input ports, and
  a plurality of ODN output ports, including two or more ODN output ports each coupled to a different respective one of the optical phase shifters; and
at least one optical coupler (OC) comprising:
  one or more OC input ports, including at least one OC input port coupled to one of the optical source ports, and
  one or more OC output ports, including at least one OC output port coupled to one of the one or more ODN input ports;
wherein a single period of a repeating pattern of wavelengths are provided from the plurality of optical source ports in the plurality of time slots, the plurality of time slots comprising:
  a first time slot in which a first of the plurality of optical source ports provides an optical wave tuned to a first wavelength,
  a second time slot, starting at or after an end of the first time slot, in which a second of the plurality of optical source ports provides an optical wave tuned to a second wavelength different from the first wavelength, and
  a third time slot, starting at or after an end of the second time slot, in which the first of the plurality of optical source ports provides an optical wave tuned to a third wavelength between the first wavelength and the second wavelength.

17. The apparatus of claim 16, wherein the at least one optical coupler comprises two or more optical couplers, the at least one optical distribution network comprises two or more optical distribution networks, and the at least one optical phased array comprises two or more optical phased arrays, wherein
  the two or more optical phased arrays comprise:
    a first optical phased array (OPA), and
    a second optical phased array (OPA);
  the two or more optical distribution networks comprise:
    a first optical distribution network (ODN) coupled to the first OPA, and
    a second optical distribution network (ODN) coupled to the second OPA; and
  the two or more optical couplers comprise:
    a first optical coupler comprising a first waveguide coupling the first of the plurality of optical source ports to the first ODN, and
    a second optical coupler comprising a second waveguide coupling the second of the plurality of optical source ports to the second ODN.

18. The apparatus of claim 16, wherein the at least one optical coupler comprises an optical switch that switches the at least one OC output port among different ones of the one or more OC input ports, including an OC input port coupled to the first of the plurality of optical source ports and an OC input port coupled to the second of the plurality of optical source ports.

19. The apparatus of claim 16, wherein the at least one optical coupler comprises a passive multiport optical coupler that comprises a plurality of OC input ports and a plurality of OC output ports.

20. A method for steering light, the method comprising:
  providing, from a plurality of optical source ports, a respective optical wave that is tuned over different respective wavelengths, within different respective time slots of a plurality of time slots;
  emitting at least a portion of the light from at least one optical phased array comprising a plurality of optical phase shifters, and a plurality of optical grating antennas, including two or more optical grating antennas each coupled to a different respective one of the optical phase shifters;
  distributing at least a portion of the light using at least one optical distribution network (ODN) comprising:
    one or more ODN input ports, and
    a plurality of ODN output ports, including two or more ODN output ports each coupled to a different respective one of the optical phase shifters; and
  coupling at least a portion of the light using at least one optical coupler (OC) comprising:
    one or more OC input ports, including at least one OC input port coupled to one of the optical source ports, and
    one or more OC output ports, including at least one OC output port coupled to one of the one or more ODN input ports;
  wherein a single period of a repeating pattern of wavelengths are provided from the plurality of optical source ports in the plurality of time slots, the plurality of time slots comprising:
    a first time slot in which a first of the plurality of optical source ports provides an optical wave tuned to a first wavelength,
    a second time slot, starting at or after an end of the first time slot, in which a second of the plurality of optical source ports provides an optical wave tuned to a second wavelength different from the first wavelength, and
    a third time slot, starting at or after an end of the second time slot, in which the first of the plurality of optical source ports provides an optical wave tuned to a third wavelength between the first wavelength and the second wavelength.

* * * * *